(12) United States Patent
Bobuk

(10) Patent No.: US 11,906,747 B1
(45) Date of Patent: Feb. 20, 2024

(54) HEAD-MOUNTED DEVICE HAVING HINGE ASSEMBLY WITH WIRING PASSAGE

(71) Applicant: META PLATFORMS TECHNOLOGIES, LLC, Menlo Park, CA (US)

(72) Inventor: Aaron Bobuk, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 937 days.

(21) Appl. No.: 16/888,477

(22) Filed: May 29, 2020

(51) Int. Cl.
| | |
|---|---|
| G02B 27/01 | (2006.01) |
| E05D 3/02 | (2006.01) |
| E05D 11/10 | (2006.01) |
| G06F 1/16 | (2006.01) |
| F16F 1/06 | (2006.01) |
| E05D 11/00 | (2006.01) |
| F16C 11/10 | (2006.01) |

(52) U.S. Cl.
CPC .......... *G02B 27/0176* (2013.01); *E05D 3/02* (2013.01); *E05D 11/0081* (2013.01); *E05D 11/1007* (2013.01); *F16C 11/10* (2013.01); *F16F 1/06* (2013.01); *G06F 1/163* (2013.01); *G06F 1/1681* (2013.01); *E05Y 2201/218* (2013.01); *E05Y 2201/474* (2013.01); *E05Y 2400/654* (2013.01); *E05Y 2900/606* (2013.01); *F16C 2316/30* (2013.01); *F16F 2228/004* (2013.01); *G02B 2027/0178* (2013.01)

(58) Field of Classification Search
CPC ........ G02B 27/0176; G02B 2027/0178; E05D 3/02; E05D 11/0081; E05D 11/1007; F16C 11/10; F16C 2316/30; F16F 1/06; F16F 2228/004; G06F 1/163; G06F 1/1681; E05Y 2201/218; E05Y 2201/474; E05Y 2400/654; E05Y 2900/606
See application file for complete search history.

(56) References Cited

U.S. PATENT DOCUMENTS

2005/0246741 A1\* 11/2005 Liu ........................ G06F 1/1679
725/50

\* cited by examiner

*Primary Examiner* — Michael C Zarroli
(74) *Attorney, Agent, or Firm* — Greenberg Traurig, LLP

(57) ABSTRACT

The disclosed head-mounted device may include a frame, a temple, at least one cable communicatively coupled to the temple and the frame, and a hinge assembly coupling the temple to the frame. The hinge assembly may include (1) a stationary member coupled to the frame, (2) a rotary member coupled to the temple and rotatable with respect to the stationary member about a rotational axis, (3) a wiring passage defined within the stationary member and the rotary member, the wiring passage surrounding and extending along the rotational axis and configured to accommodate at least one cable passing therethrough, and (4) a biasing member positioned to apply a biasing force to hold the rotary member in one of a plurality of selected orientations relative to the stationary member. Various other devices, assemblies, systems, and methods are also disclosed.

20 Claims, 14 Drawing Sheets

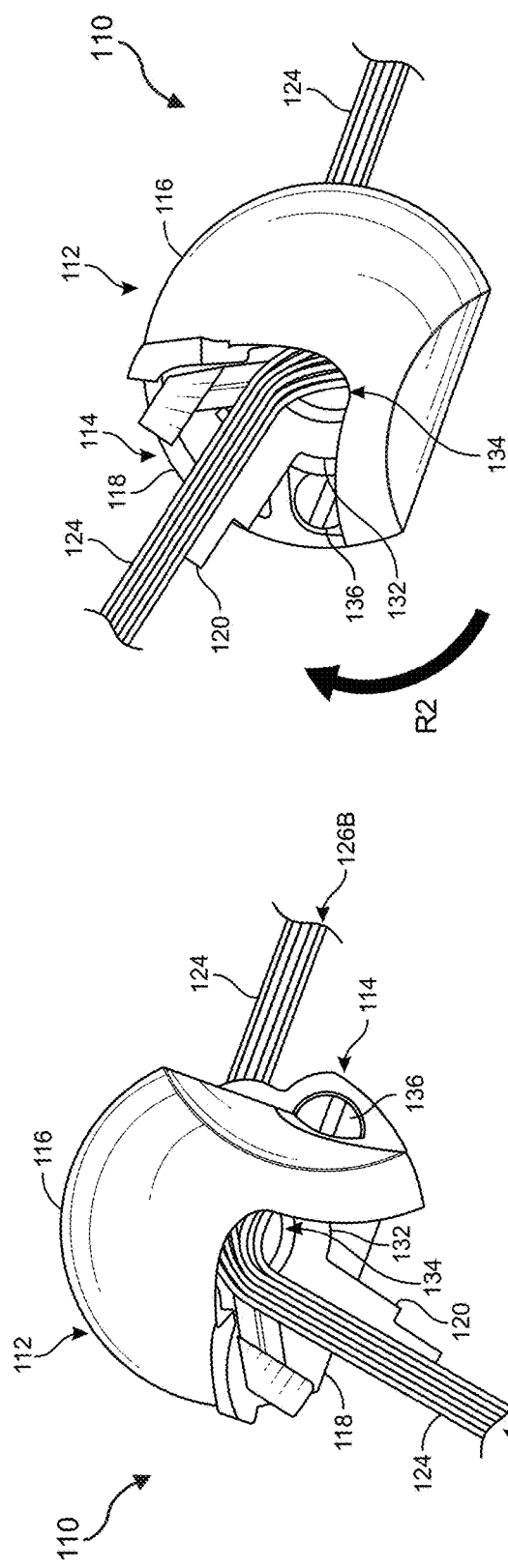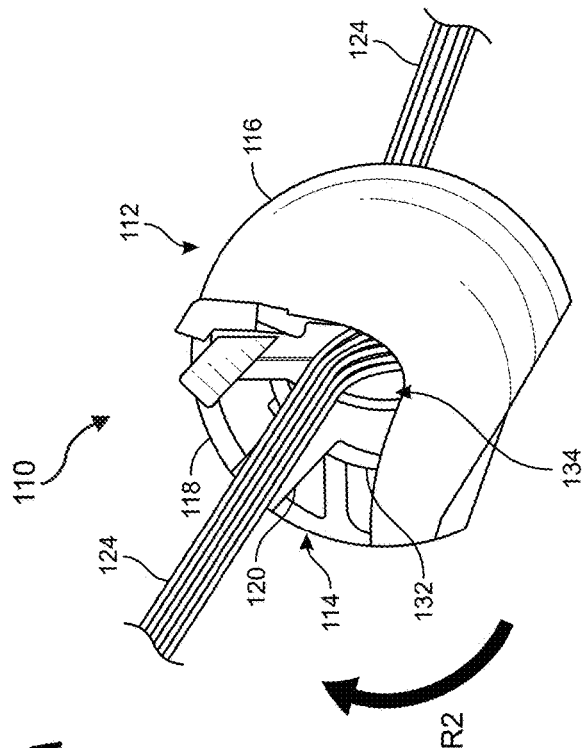

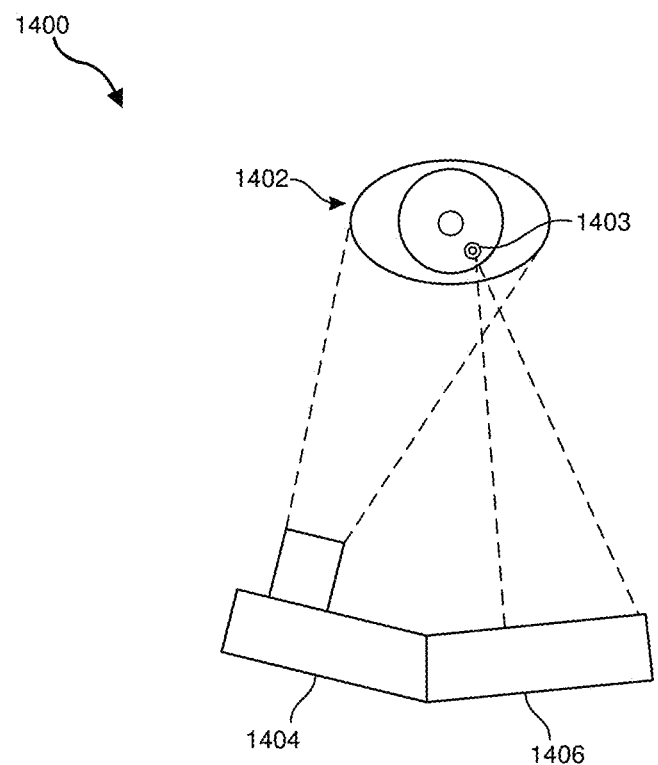
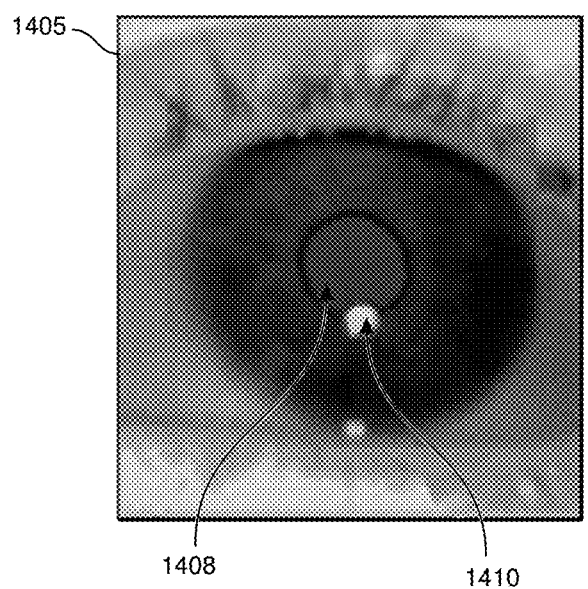
FIG. 14

HEAD-MOUNTED DEVICE HAVING HINGE ASSEMBLY WITH WIRING PASSAGE

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 4A is a top view of an exemplary hinge assembly with a rotary section oriented in a selected orientation relative to a stationary section according to embodiments of this disclosure.

FIG. 4B is a top view of the exemplary hinge assembly of FIG. 4A with the rotary section oriented in another selected orientation relative to the stationary section.

FIG. 4C is a top view of the exemplary hinge assembly of FIG. 4A with the rotary section oriented in another selected orientation relative to the stationary section.

FIG. 14 is a more detailed illustration of various aspects of the eye-tracking subsystem illustrated in FIG. 13.

Figure 1:
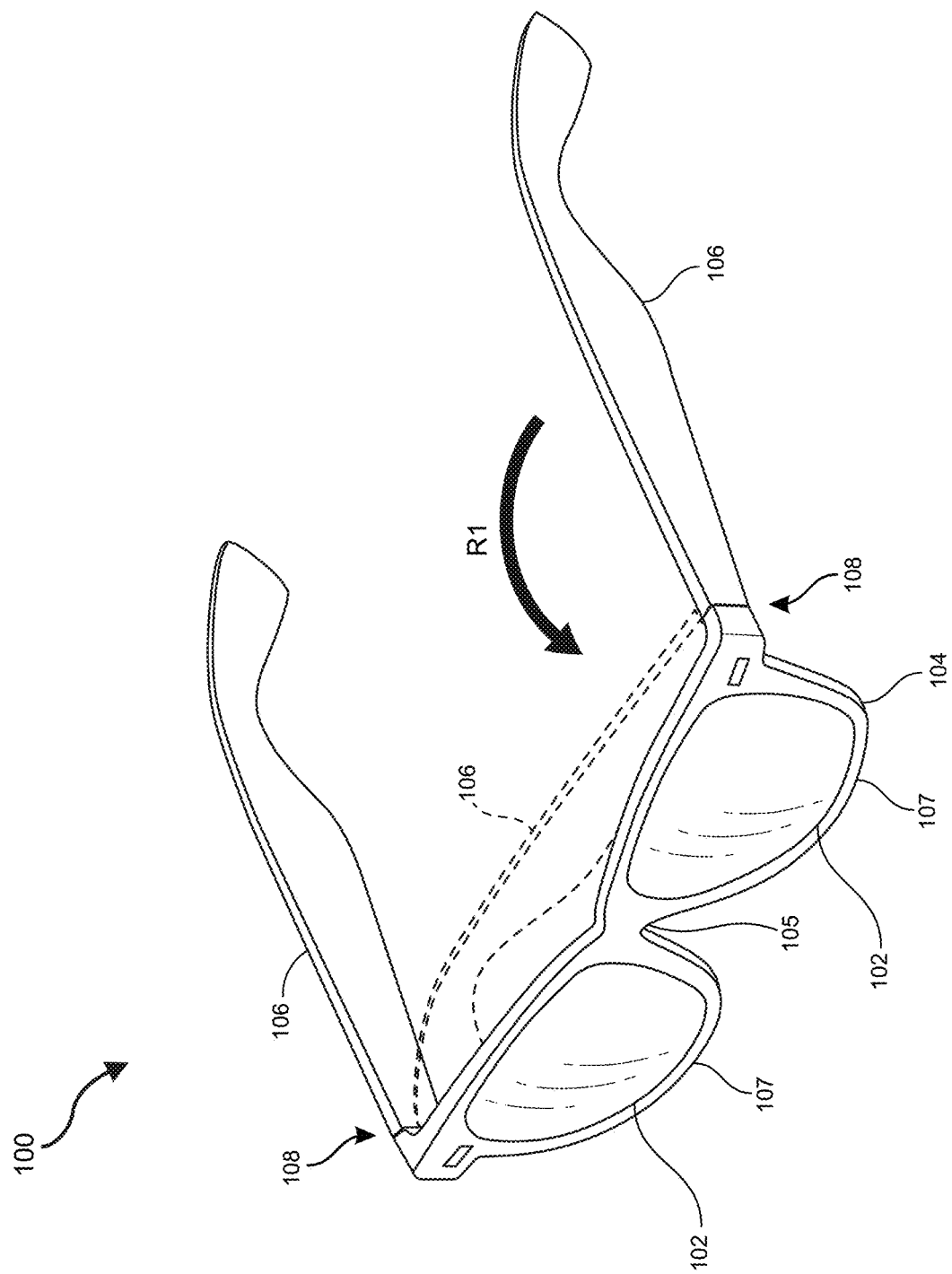
FIG. 1 is a perspective view of exemplary augmented-reality glasses according to embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial-reality systems are widely gaining in popularity for use in a growing number of activities. For example, artificial-reality systems (including augmented-reality, mixed-reality, and virtual-reality devices, such as headsets) may provide users with enhanced entertainment experiences, interactions with people in computer-generated simulations of three-dimensional environments, or views of images superimposed on real-world views. Such devices and headsets are also commonly used for purposes other than recreation. For example, governments may use such devices for military training, medical professionals may use the devices to simulate surgery, and engineers may use such devices as design visualization aids.

Headsets that provide interaction with real-world environments, such as augmented-reality glasses and certain mixed-reality devices, have emerged as a new generation of smart devices geared towards providing users with ready access to information and helpful tools and enabling unique interactions between the users and their surroundings. Such devices often include features that make such headsets useful in a variety of everyday settings, such as work, school, and social environments, that would not be suitable for more immersive artificial-reality systems (e.g., virtual-reality headsets). However, due to the space requirements of physical hardware components required to run these headsets, they may be bulkier and more conspicuous than users desire. Additionally, conventional headsets may be difficult to properly position on a user's head and/or may be uncomfortable to wear due to variations in user head size and shape and limitations in device adjustment capabilities.

The present disclosure is generally directed to headset display devices, such as augmented-reality glasses, having hinge assemblies that connect frames and temples of the devices. In some embodiments, a hinge assembly may include a stationary member coupled to a frame for mounting lenses and a rotary member that is coupled to a temple and that is rotatable with respect to the stationary member. A wiring passage extending along a rotational axis of the hinge assembly may be defined within the stationary member and the rotary member. At least one cable for connecting electrical components in the temple to components in the frame may pass through the wiring passage. The hinge assembly may also include a biasing member, such as a compression spring, surrounding at least a portion of the wiring passage and positioned to apply a biasing force to hold the rotary member and the coupled temple in one of a plurality of selected orientations (e.g., an open or closed temple orientation) relative to the stationary member.

As will be explained in greater detail below, such hinge assemblies may provide a range of motion that enables a variety of users to easily don and comfortably wear the headsets while also allowing for the temples to be folded inward towards the frames for convenient storage when not worn. The hinge assemblies may provide easy user operation while securely holding the temples in a selected orientation. Additionally, the hinge assemblies may enable the temples, which may not be flexible, to be over-extended outwardly by users to facilitate donning and doffing of the headsets. Accordingly, in contrast to conventional eyewear, the disclosed hinge assemblies may enable a range of adjustment for securing the headsets to the heads of users while not requiring flexibility in the front frame (e.g., the bridge) or the temples. Additionally, in contrast to conventional spring-actuated hinges, the hinge assemblies described herein may provide passage for electrical and/or optical wiring that connects electronic components in the temples to components in the frames and/or display lenses mounted to the frames. Accordingly, the space requirements for the frames may be minimized as bulkier components, such as batteries, storage media, ports, etc., are instead positioned in the headset temples. Wiring cables passing through the hinge assemblies may be twisted when the temples are repositioned, rather than being stretched or sharply bent, so as to preserve the integrity of the cables over an extended period of use.

Features from any of the embodiments described herein may be used in combination with one another in accordance with the general principles described herein. These and other embodiments, features, and advantages will be more fully understood upon reading the following detailed description in conjunction with the accompanying drawings and claims. The following will provide, with reference to FIGS. 1-14, detailed descriptions of head-mounted devices, hinge assemblies, and methods for using the same.

FIG. 1 is diagram of a head-mounted device 100 according to some embodiments. Head-mounted device 100 may include one or more lenses 102, such as right- and left-eye lenses 102, secured in a frame 104 that surrounds lenses 102. Lenses 102 may be transparent or semi-transparent, allowing a wearer to view their external environment. In some examples, lenses 102 may have a customized optical power to provide vision correction to the user. In various examples, lenses 102 may also function as displays, such as near-eye displays, that include or utilize a display system (e.g., a projection display system) to present media to a user. Examples of media presented by lenses 102 include one or more images, a series of images (e.g., a video), audio, or some combination thereof. Lenses 102 may be configured to operate as augmented-reality displays such that a user can see media projected in their field of view while simultaneously having a view of at least a portion of the real-world environment. In some embodiments, lenses 102 may be modified to also operate as virtual-reality displays, mixed-reality displays, or some combination thereof. Accordingly, in some embodiments, lenses 102 may augment or replace views of a physical, real-world environment with computer-generated elements (e.g., images, video, etc.).

According to various embodiments, frame 104 may be a frame of eye-wear glasses that may secure lenses 102 in place on the head of a user. A bridge 105 of frame 104 between lenses 102 may be sized to fit over and rest on the top of the bridge of the user's nose. Although not illustrated in FIG. 1, in some embodiments, head-mounted device 100 may include nose pads for resting on the bridge of the user's nose. Head-mounted device 100 may also include temples 106 dimensioned to rest on the top of and/or behind the user's ears and rims 107 sized and configured to rest on or against the user's cheeks. In at least one embodiment, head-mounted display 100 may include a hinge 108 rotatably coupling each of a pair of temples to frame 104. For example, as shown, hinges 108 may couple respective temples 106 to right and left peripheral regions of frame 104 (right and left, as used herein, correspond to right and left eyes of a user).

As will be described in greater detail below, each temple 106 may be rotated via the corresponding hinge 108 between an open position (illustrated in solid lines in FIG. 1), in which temple 106 extends generally perpendicular to frame 104, and a closed position (illustrated in broken lines in FIG. 1), in which temple 106 is rotated inward such that it is more aligned with frame 104. For example, as illustrated in FIG. 1, a left-side temple 106 may be rotated about a left-side hinge 108 in rotational direction R1 from the open position to the closed position. Temples 106 may be oriented in the open position to allow head-mounted device 100 to be securely worn on a user's head. Additionally, temples 106 may be oriented in the closed position to minimize the profile of head-mounted device 100, enabling compact storage of head-mounted device 100 and minimizing potential damage to temples 106. As will be discussed, hinges 108 may hold temples 106 in a selected position, such as the open or closed position, until forced into a new position by, for example, a user.

According to some examples, hinges 108 may further allow temples 106 to be rotated outward from each other (i.e., temples 106 may be rotationally over-extended) by a user to provide additional space between the pair of temples 106, facilitating donning and/or doffing of head-mounted device 100 on the wearer's head. For example, left-side temple 106 may be rotated outwardly about left-side hinge 108 in a direction opposite rotational direction R1 and right-side temple 106 may be rotated outwardly as well to provide an increased gap between temples 106 so as to accommodate the user's head during mounting and removal. Subsequently, as the user relaxes an applied outward force pushing temples 106 further apart, temples 106 may be forced by hinge assemblies of hinges 108 back toward the open positions illustrated in FIG. 1 to securely mount and hold head-mounted device 100 on the user's head. In some examples, the space between left- and right-side temples 106 when these temples are each in the open position may be less than that required to accommodate the heads of many or all users. As such, left- and right-side temples 106 may be rotationally over-extended beyond their open positions when worn. In these examples, left- and right-side hinges 108 may apply biasing forces directed toward the open positions such that temples 106 are forced rotationally inward against opposite sides of the user's head. Thus, head-mounted device 100 may be more securely held on the heads of users due to the over-extended states of hinges 108 during wear.

Head-mounted device 100 may additionally or alternatively include various other features and/or components, including, for example, directional speakers to provide audio to a user, bone conduction transducers for providing sound signals to a user via vibrational bone conduction in an auditory region of the user's head, tracking and/or recording cameras, passive and/or active front and/or rear facing cameras to capture images from the user's environment, eye tracking cameras, ambient light, night vision, and/or thermal imaging sensors, multimode connectivity antennas for wireless communication, audio microphones for capturing sound in the user's environment, lights for illuminating a user's environment, inertial, haptic, environmental, and/or health monitoring sensors, and/or any other suitable components, without limitation.

Figure 2:
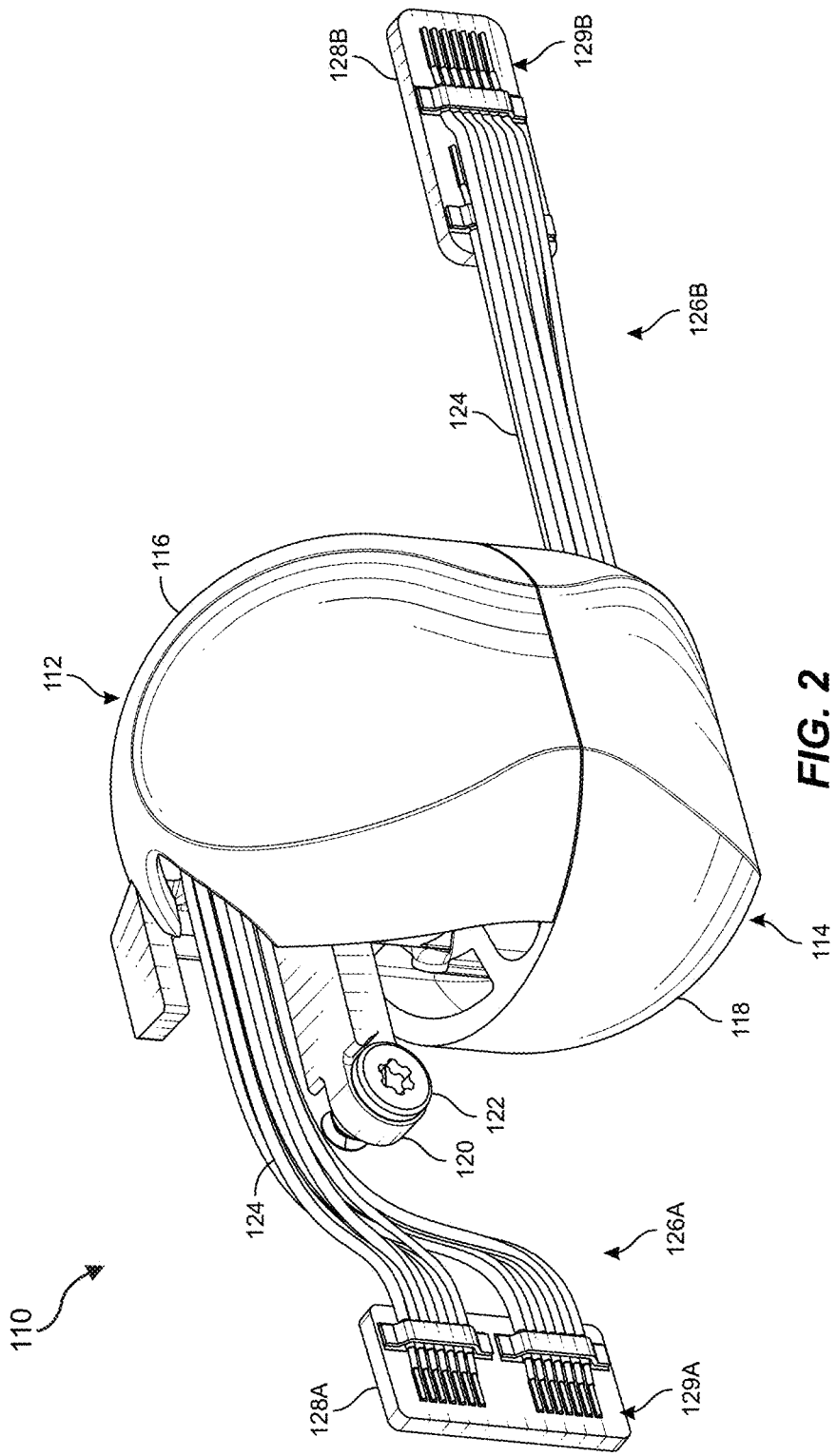
FIG. 2 is a perspective view of an exemplary hinge assembly according to embodiments of this disclosure.
Figure 3:
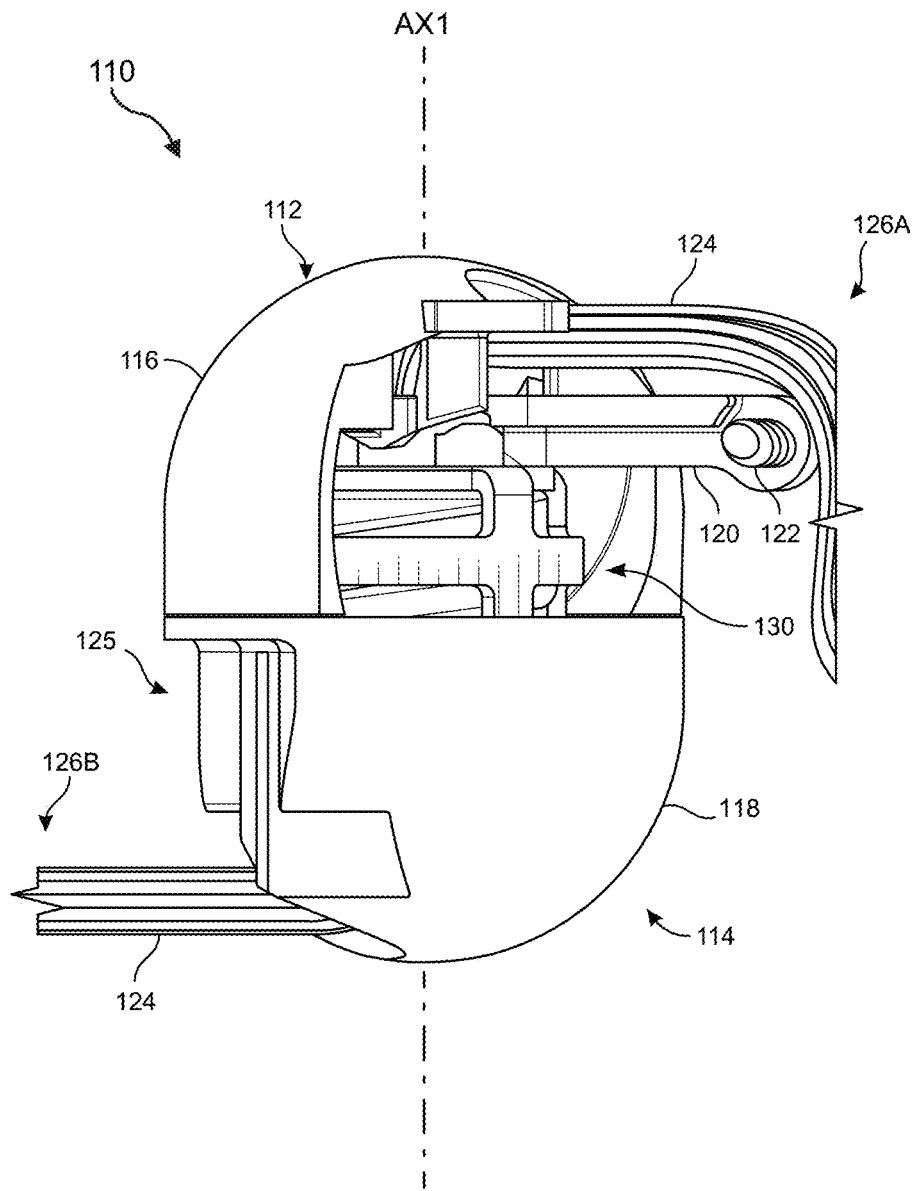
FIG. 3 is a side view of an exemplary hinge assembly according to embodiments of this disclosure.

FIGS. 2 and 3 illustrate a hinge assembly 110 of a hinge 108 in accordance with various embodiments. The hinge assembly 110 shown in these figures is configured to be used, for example, in a hinge 108 that is coupled to a left side of frame 104 (i.e., the side closest to the user's left eye) and to a temple 106 that is rotatable in rotational direction R1 from an open position to a closed position, as illustrated in FIG. 1. A hinge assembly for use on the right side of frame 104 may have the same or similar configuration with components mirroring those in hinge assembly 110. FIGS. 2 and 3 show the disposition of hinge assembly 110 when, for example, temple 106 is oriented in the open position with respect to frame 104 (see, e.g., FIG. 1).

As shown, hinge assembly 110 may include a stationary section 114 and a rotary section 112 that is rotatable with respect to stationary section 114 about a rotational axis (see rotational axis AX1 in FIG. 3). In some embodiments, stationary section 114 may be coupled to frame 104 and rotary section 112 may be coupled to a corresponding temple 106. For example, stationary section 114 may be fastened, bonded, and/or otherwise fixedly secured to a peripheral mounting region of frame 104 such that the position and orientation of stationary section 114 is maintained relative to frame 104 during rotation of rotary section 112 and temple 106. Additionally, rotary section 112 may be fastened, bonded, and/or otherwise fixedly secured to temple 106 so that rotary section 112 is rotated in conjunction with temple 106. According to at least one embodiment, rotary section 112 may include a rotary cover 116 and stationary section 114 may include a stationary cover 118. Rotary cover 116 and stationary cover 118 may house an internal assembly 130 that includes internal portions of rotary section 112 and stationary section 114 (see, e.g., FIGS. 5-9C). Rotary cover 116 may rotate in conjunction with rotary section 112 with respect to stationary section 114 and stationary cover 118. In various examples, rotary cover 116 and stationary cover 118 may protect internal components of rotary section 112 and stationary section 114 and/or may conceal internal portions of rotary section 112 and stationary section 114 from view (e.g., when temple 106 is in a closed position with a visible gap between temple 106 and frame 104) while providing a visually appealing exterior surface. In at least one example, rotary cover 116 and stationary cover 118 may have rounded exterior surfaces, such as partial-spherical, partial-ellipsoidal, cylindrical, partial-cylindrical, cuboid, and/or any other geometric or other suitable shapes, that are visible when temple 106 is in a closed position. Additionally, as shown in FIG. 3, a portion of stationary section 114, such as stationary cover 118, may include a frame mounting region 125 for mounting hinge assembly 110 to frame 104 of head-mounted device 100. For example, frame mounting region 125 may be shaped and configured to fixedly couple stationary section 114 to a complementary mounting region of frame 104. Stationary section 114 may be mechanically fastened, adhered to, or otherwise securely attached to frame 104 in any suitable manner.

In some embodiments, rotary section 112 may include an extension arm 120 configured to be coupled to temple 106. Extension arm 120 may, for example, protrude from a central portion of rotary section 112 and may extend in a direction that is perpendicular or substantially perpendicular to rotational axis AX1 (i.e., a direction oriented 90°±5° from rotational axis AX1). Extension arm 120 may be oriented to extend generally or substantially parallel to an extension direction of temple 106. Temple 106 may be secured to extension arm 120 in any suitable manner, such as, for example, via a fastening element 122 located at or near a distal end of extension arm 120 (e.g., fastening element 122 may be a screw or other suitable fastener extending through at least a portion of extension arm 120 and temple 106). In various examples, extension arm 120 may fixedly secure temple 106 to rotary section 112 while providing sufficient mechanical leverage to facilitate rotation of rotary section 112 in conjunction with an external force applied to temple 106 (e.g., an opening or closing force applied by a user). Securing rotary section 112 to temple 106 at a position located more outwardly from rotational axis AX1 may provide a mechanical advantage for rotating rotary section 112 to actuate hinge assembly 110.

Hinge assembly 110 may include one or more electrical and/or optical cables connected to each of temple 106 and frame 104. For example, as shown in FIGS. 2 and 3, hinge assembly 110 may include a plurality of cables 124 for electrically and/or communicatively coupling components of temple 106 to components of frame 104. As will be described in greater detail below, cables 124 may pass through a wiring passage (e.g., wiring passage 134 shown in FIGS. 4A-4C) extending along rotational axis AX1 through rotary section 112 and stationary section 114. Cables 124 may include a temple region 126A protruding from rotary section 112 toward a temple connector 128A that is configured to electrically and/or optically couple cables 124 to a corresponding connection region of temple 106. Additionally, cables 124 may include a frame region 126B protruding from stationary section 114 toward a frame connector 128B configured to electrically couple ends of cables 124 to a corresponding connection region of frame 104. Ends of cables 124 may include terminals 129A and terminals 129B respectively located on temple connector 128A and frame connector 128B. Cables 124 may include any suitable type of electrical cables configured to transmit data signals and/or power between components of temple 106 and frame 104. For example, cables 124 may include a plurality of micro-coaxial cables that each include a conducting core for carrying data signals (e.g., video signals, audio signals, sensor signals, etc.) and/or an outer shield that is kept at a common potential (e.g., a ground potential) for carrying power. Additionally or alternatively, cables 124 may include any other suitable type of cables, including, for example, fiber optic cables that transmit light-based signals.

Electrically and/or optically connecting temple 106 to frame 104 may allow for various electronic components of head-mounted device 100 to be distributed between temple 106 and frame 104 in a selected manner. Such a distribution of electronic components may allow for reductions in the size and/or profile of frame 104, and in some examples, may enable the inclusion of additional components and/or expanded capabilities in comparison to conventional head-mounted devices, such as augmented-reality glasses.

Accordingly, head-mounted device 100 may achieve or more closely approximate the form factor of a conventional pair of eyeglasses while providing a richer and more versatile experience for users. For example, rather than housing a power supply (e.g., batteries), computational resources (e.g., memory, processors, etc.), communication resources (e.g., antennas, ports, etc.), and/or additional features in frame 104 alone, one or more electronic components may instead be disposed on or within one or both of temples 106. Additionally, including such components within temples 106 may eliminate the need to use a head-mounted device in conjunction with an external device (e.g., an external computing device, battery pack, etc.) that is connected via noticeable wiring, thereby increasing ease-of-use for wearers in a variety of settings and enhancing the overall user experience.

FIGS. 4A-4B show hinge assembly 110 with rotary section 112 disposed in different positional states relative to stationary section 114. FIG. 4A illustrates rotary section 112 in a closed position during which, for example, an attached temple 106 is in a closed position so as to be folded inward and generally aligned with frame 104 (see, e.g., temple 106 shown in broken lines in FIG. 1). FIG. 4B illustrates rotary section 112 in an open position during which, for example, temple 106 is in an open position such that temple 106 extends away from frame 104 in a direction generally perpendicular or orthogonal to frame 104 (see, e.g., temple 106 shown in solid lines in FIG. 1). For example, in the open position, temple 106 may extend from frame 104 at an angle of between approximately 70° and approximately 100° (e.g., approximately 70°, approximately 75°, approximately 80°, approximately 85°, approximately 90°, approximately 95°, approximately 100°).

FIG. 4C illustrates rotary section 112 in an over-extended position (i.e., an over-torqued position) during which, for example, temple 106 and rotary section 112 are forced outward beyond the open position so as to be disposed further away from an opposite temple 106 mounted to frame 104. In some examples, in the open position, temples 106 may each be angled inward towards each other at an angle less than 90° (e.g., approximately 80°) such that temples 106 contact sides of a user's head, forcing each temple 106 into an over-extended position when worn (e.g., with temples 106 each oriented at an angle greater than 80° up to approximately 100°). With temples 106 oriented in the over-extended position during wear, hinge assemblies 110 may each exert an inward force against temples 106, providing a clamping force to securely hold head-mounted device 100 on the user's head. Also visible in FIGS. 4A-4C is a portion of a rotary member 132 of rotary section 112 and a portion of a stationary member 152 of stationary section 114.

According to some embodiments, rotary section 112 may be securely held in either the open position or the closed position with respect to stationary section 114, and rotary section 112 may be moved to a new position when a sufficient amount of torque is applied to rotary section 112 (e.g., via force applied by a user to a coupled temple 106). For example, at least a threshold amount of torque may be applied to rotate rotary section 112 in rotational direction R2 from the closed position shown in FIG. 4A to the open position shown in FIG. 4B. At least the threshold amount of torque may also be applied to rotate rotary section 112 in an opposite rotational direction (e.g., rotational direction R1 in FIG. 1) from the open position to the closed position. The angular difference between the open position and the closed position may be approximately 90° (i.e., 90°±5°). In some examples, the angular difference between the open position and the closed position may be between approximately 80° and approximately 100° (e.g., approximately 80°, approximately 85°, approximately 90°, approximately 95°, approximately 100°).

In some embodiments, additional torque may be applied to rotary section 112 in rotational direction R2, causing rotary section 112 to further rotate with respect to stationary section 114 to an over-extended position, such as that illustrated in FIG. 4C. When one or both of hinge assemblies 110 of head-mounted device 100 are forced into over-extended positions, temples 106 may be angled outward from each other so that a greater gap is opened between the two temples 106. This enlarged gap between temples 106 may facilitate mounting of head-mounted device 100 onto the head of a wearer by providing greater clearance for temples 106 as head-mounted device 100 is moved into position on the wearer's head. According to at least one example, each temple 106 and rotary section 112 may remain in the over-extended position when additional outward force is applied by a user to temples 106. Subsequently, each rotary section 112 and corresponding temple 106 may return to the open position of FIG. 4B when the outward force applied to temples 106 is reduced or removed.

In various examples, temples 106 may be dimensioned and oriented such that they fit closely to opposite sides of the wearer's head when worn, extending and curving over the user's ears to securely hold head-mounted device 100 in place. According to some examples, one or both of rotary sections 112 and corresponding temples 106 may be at least slightly over-extended outward beyond the open position shown in FIG. 4B so as to accommodate wider head dimensions. Rotary section 112 may be over-extended under an applied torque such that a difference between the over-extended position and the open position is greater than 0° and less than or equal to approximately 15° (i.e., 15°±3°). For example, rotary section 112 may be rotated up to a maximum over-extended or over-torqued angular difference of approximately 5°, approximately 10°, approximately 15°, or approximately 20° from the open position.

As shown in these figures, cables 124 may extend through hinge assembly 110 via a wiring passage 134 defined within rotary section 112 and stationary section 114. As will be described in greater detail below, wiring passage 134 may surround and extend along the rotational axis of rotary section 112 (e.g., AX1 shown in FIG. 3 in) between an opening defined in rotary member 132 (a portion of which is visible in FIGS. 4A-4C) and an opposite opening defined in rotary member 132 and/or stationary member 152. Portions of cables 124 extending through wiring passage 134 defined in hinge assembly 110 may twist during use so as to allow for repositioning of portions of cables 124 in temple region 126A in conjunction with repositioning of rotary cover 116 and an attached temple 106. By causing portions of cables 124 to primarily twist rather than bend in certain portions of the cables (e.g., by twisting rather than bending to accommodate an approximately 70°-110° change in wiring path orientation between the closed position in FIG. 4A and the over-extended position in FIG. 4C), hinge assembly 110 may reduce stresses exerted by bending and/or stretching at points along cables 124 during use, thereby reducing wear and damage to cables 124 and extending their operational life.

Figure 5B:
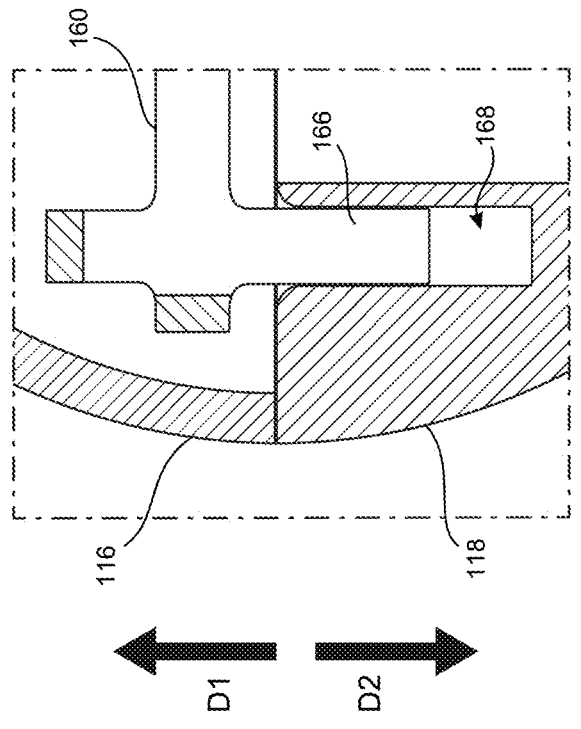
FIG. 5B is a view of a portion of an exemplary hinge assembly that includes a holding member slidably coupled to a cover according to embodiments of this disclosure.
Figure 5A:
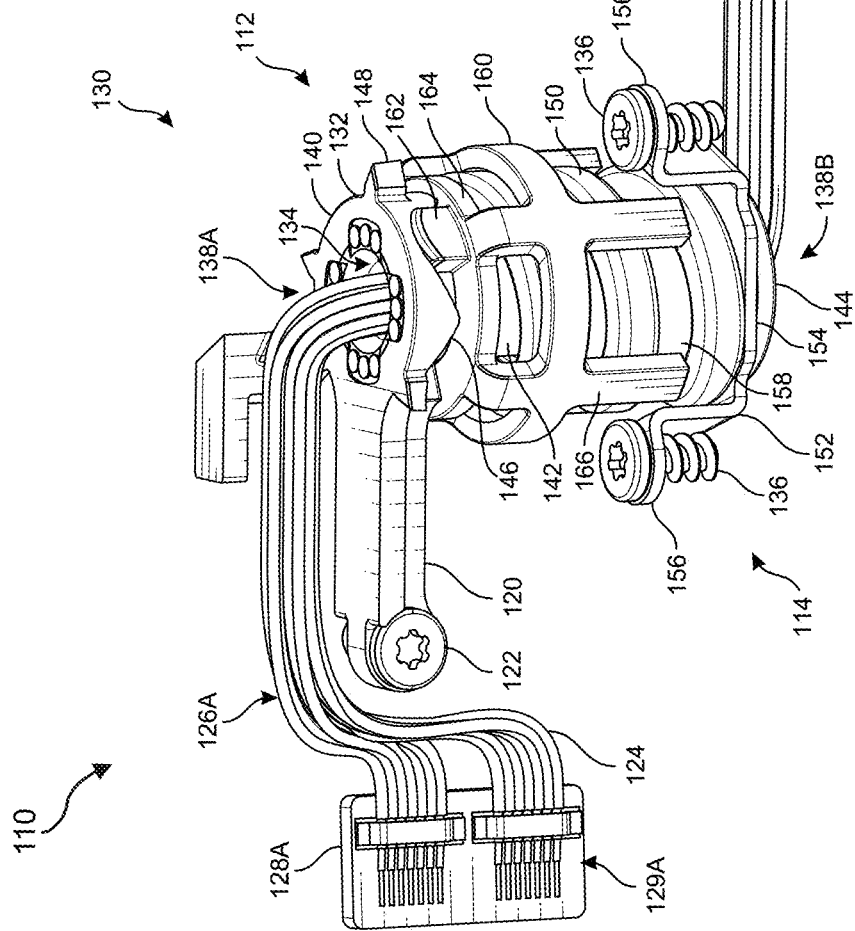
FIG. 5A is a perspective view of an exemplary hinge assembly showing various internal components according to embodiments of this disclosure.

FIG. 5A shows a hinge assembly 110 with rotary cover 116 and stationary cover 118 removed, exposing internal assembly 130. As illustrated in these figures, wiring passage 134 may extend through hinge assembly 110 from a first end 138A to a second end 138B. Wiring passage 134 may be defined by rotary member 132 and/or stationary member 152, each of which surround wiring passage 134. Temple region 126A of cables 124 may protrude from an opening of wiring passage 134 at first end 138A and frame region 126B of cables 124 may protrude from an opposite opening of wiring passage 134 at second end 138B.

Figure 7:
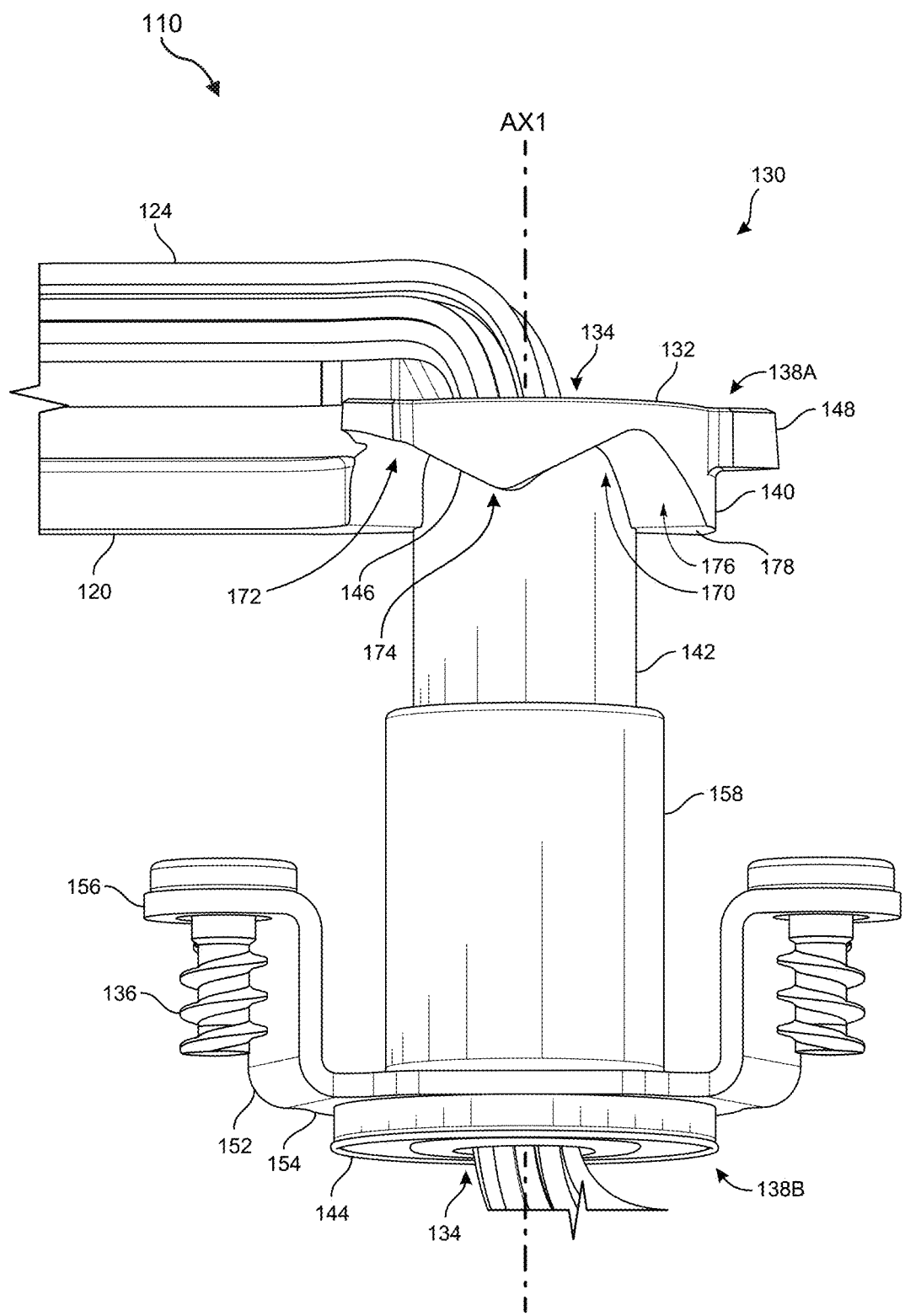
FIG. 7 is a side view of a portion of an exemplary hinge assembly showing various internal components according to embodiments of this disclosure.

According to at least one embodiment, rotary member 132 may include a cam portion 140 located at or near first end 138A and a rotary barrel portion 142 extending from cam portion 140 toward second end 138B in a direction parallel or substantially parallel to rotational axis AX1, about which rotary member 132 is rotatable relative to 152 (see, e.g., FIG. 7). Extension arm 120 of rotary member 132 may extend radially outward from cam portion 140 in a direction perpendicular or substantially perpendicular to rotational axis AX1. Extension arm 120 may be integrally formed with or fixedly coupled to cam portion 140. For example, extension arm 120 and cam portion 140 may be molded (e.g., by metal injection molding, MIM) and/or machined from a common piece of material, such as such as a metal (e.g., steel, aluminum, etc.), a rigid polymer, and/or any other material having suitable strength and rigidity to allow for the application of torque sufficient to operate hinge assembly 110. In various examples, rotary member 132 may also include one or more coupling protrusions 148 protruding from cam portion 140 (e.g., protruding radially outward from cam portion 140). Each coupling protrusion 148 may fit within and engage a corresponding recess or feature defined within a rotary cover 116 (see, e.g., rotary cover 116 illustrated in FIGS. 2-4C) to position and secure rotary cover 116 to rotary member 132. In some examples, coupling protrusions 148 may be configured as crush ribs (as illustrated in FIG. 5A), snap fits, and/or any other suitable fastening features to securely engage corresponding portions of rotary cover 116. Rotary cover 116 may additionally or alternatively be coupled and secured to rotary member 132 in any other suitable manner. Rotary barrel portion 142 may have a cylindrical or substantially cylindrical exterior surface and/or interior surface centered about rotational axis AX1. In some examples, rotary barrel portion 142 may be a tubular element that is coupled to cam portion 140 via, for example, laser welding, press fitting, and/or any other suitable bonding and/or fastening technique. In one example, rotary barrel portion 142 and cam portion 140 of rotary member 132 may be assembled into a fixture and then laser welded to one another to fix the parts together. Additionally or alternatively, rotary barrel portion 142 may be integrally formed with cam portion 140.

Rotary barrel portion 142 may be rotationally coupled with a corresponding portion of stationary member 152 such that rotary member 132 is rotatable relative to stationary member 152. According to some embodiments, stationary member 152 may include a stationary barrel portion 158 that extends from a base portion 154, which is located at or near second end 138B, toward first end 138A in a direction parallel or substantially parallel to rotational axis AX1 (see FIG. 7). Stationary barrel portion 158 may have a cylindrical or substantially cylindrical exterior surface and/or interior surface centered about rotational axis AX1 such that a surface of stationary barrel portion 158 is coaxial or substantially coaxial with an interfacing surface of rotary barrel portion 142. In some examples, stationary barrel portion 158 may be a tubular element (e.g., a barrel-shaped element) that is coupled to stationary member 152 via, for example, welding and/or any other suitable bonding and/or fastening technique. Additionally or alternatively, stationary barrel portion 158 may be integrally formed with stationary member 152.

In the example illustrated in FIG. 5A, rotary barrel portion 142 of rotary member 132 may have a cylindrical or substantially cylindrical outer surface that is positioned within a cavity defined by a complementary cylindrical inner surface within stationary barrel portion 158 of stationary member 152. Accordingly, rotary barrel portion 142 may rotate within stationary member 152 in conjunction with rotation of rotary member 132. For example, rotary barrel portion 142 of rotary member 132 may extend entirely through the inner cavity of stationary barrel portion 158 such that a portion of rotary barrel portion 142 emerges from stationary barrel portion 158 at or near second end 138B. Rotary barrel portion 142 of rotary member 132 may be secured within stationary barrel portion 158 by a retaining element 144 (e.g., a retaining clip, such as an E-clip, an outwardly projecting flange, and/or any other suitable fastening element that permits rotation of rotary barrel portion 142 within stationary barrel portion 158). In this example, wiring passage 134 may be defined entirely by rotary member 132 (e.g., by a cylindrical or substantially cylindrical inner surface of rotary member 132), with wiring passage 134 extending through cam portion 140 and rotary barrel portion 142.

In additional examples, rotary barrel portion 142 of rotary member 132 may surround at least a portion of stationary member 152 (e.g., at least a portion of stationary barrel portion 158). For example, rotary barrel portion 142 may define an inner cavity (e.g., a cylindrical or substantially cylindrical inner cavity) and stationary barrel portion 158 of stationary member 152 may be positioned within the inner cavity of rotary barrel portion 142 such that rotary barrel portion 142 is rotatable about stationary barrel portion 158. In one example, a single barrel portion 158 having, for example, a cylindrical or substantially cylindrical periphery may be coupled to stationary member 152 and may extend through at least a portion of rotary member 132 (e.g., through a cavity defined within cam portion 140) such that rotary member 132 is rotatable about the stationary barrel portion.

According to various embodiments, stationary member 152 of hinge assembly 110 may be fixedly coupled to frame 104 of head-mounted device 100 (see, e.g., FIG. 1) such that stationary member 152 is securely held to frame 104 as rotary member 132 rotates with an attached temple 106 about rotational axis AX1. For example, stationary member 152 may include one or more mounting portions 156 that are positioned and dimensioned to couple stationary member 152 to frame 104. In the example illustrated in FIG. 5, stationary member 152 may include a plurality of mounting portions 156 that each protrude outwardly from rotational axis AX1 and include a hole sized to hold a corresponding fastener 136. Each fastener 136 may include any suitable fastening element, such as, for example, a screw, a bolt, and/or any other suitable fastener for coupling stationary member 152 directly or indirectly to frame 104. For example, fasteners 136 may be screws that extend through mounting portion 156 into corresponding holes within stationary cover 118 of stationary section 114, which may be coupled to frame 104 via, for example, frame mounting region 125 shown in FIG. 3.

According to various embodiments, hinge assembly 110 may further include a holding member 160 that is disposed between at least a portion of rotary member 132 and stationary member 152. For example, as shown in FIG. 5A, holding member 160 may be disposed between base portion 154 of stationary member 152 and cam portion 140 of rotary member 132. Holding member 160 may be configured to securely hold rotary section 112, including rotary member 132, in a selected position relative to stationary section 114, which includes stationary member 152. Holding member 160 may additionally allow for rotation of rotary section 112 about rotational axis AX1 with respect to stationary section 114 in response to an applied torque, such as an increased torque applied by a user via an attached temple 106.

Holding member 160 may include an engagement member 162 (i.e., a cam follower) that is forced against a corresponding surface region of cam portion 140, such as a camming surface 146, by a spring 150 or other suitable biasing member that forces engagement member 162 into engagement with cam portion 140. In at least one embodiment, spring 150 may be a compression spring that surrounds at least a portion of rotary barrel portion 142 of rotary member 132 and/or least a portion of stationary barrel portion 158 of stationary member 152. As shown in FIG. 5A, spring 150 may be disposed and/or constrained between base portion 154 of stationary member 152 and a spring interface portion 164 (i.e., a biasing interface portion) of holding member 160. Spring 150 may, for example, exert a force against spring interface portion 164 of holding member 160 in a direction D1 that is parallel or substantially parallel (e.g., coaxial or substantially coaxial) to rotational axis AX1 (i.e., a direction oriented at an angle of 0°±5° with respect rotational axis AX1 shown in FIGS. 3 and 7) such that engagement member 162 is forced against camming surface 146 of cam portion 140.

In at least one embodiment, camming surface 146 may circumferentially surround a portion of rotary barrel portion 142 of rotary member 132 such that engagement member 162 is slidable along camming surface 146 as rotary member 132 and camming surface 146 are rotated with respect to engagement member 162. As will be described in greater detail below, camming surface 146 may include two or more engagement recesses into which engagement member 162 of holding member 160 may be forced by spring 150. Additionally, camming surface 146 may include sloped regions that force engagement member 162 in a direction D2 (i.e., a direction opposite the direction D1 of the biasing force exerted by spring 150) when rotary member 132 is rotated with respect to stationary member 152 and holding member 160, thereby forcing holding member 160 in direction D2 toward second end 138B of hinge assembly 110 and at least partially compressing spring 150. According to some examples, spring interface portion 164 may be located adjacent spring 150 and may be dimensioned to abut an end region of spring 150. For example, spring interface portion 164 may have a ring-shaped or partially ring-shaped profile peripherally surrounding rotary barrel portion 142 of rotary member 132 and abutting an adjacent end portion of spring 150. One or more engagement members 162 may protrude from spring interface portion 164 toward one or more corresponding camming surfaces 146 of cam portion 140 in a direction parallel or substantially parallel to rotational axis AX1. Accordingly, forces exerted by spring 150 and cam portion 140 may be transmitted axially in directions D1 and D2, respectively, between spring 150, spring interface portion 164, engagement members 162, and camming surfaces 146.

In various embodiments, holding member 160 may also include one or more guide protrusions 166. For example, a portion of holding member 160 may radially surround at least a portion of spring 150 with a plurality of guide protrusions 166 extending toward second end 138B of hinge assembly 110 in a direction parallel or substantially parallel to rotational axis AX1 (see FIGS. 3 and 7). Guide protrusions 166 may be dimensioned and positioned to fit within and engage with corresponding guide recesses defined within stationary section 114 of hinge assembly 110. For example, as shown in the cross-sectional side view of hinge assembly 110 in FIG. 5B, a guide protrusion 166 may fit within and extend along a portion of a corresponding guide channel 168 defined within stationary cover 118, which may be fixedly coupled to stationary member 152 of stationary section 114 (see, e.g., FIGS. 2 and 3). Guide protrusion 166 may be constrained within guide channel 168 such that holding member 160 is prevented by stationary cover 118 from rotating about rotational axis AX1. Additionally, as shown in FIG. 5B, rotary cover 116 of rotary section 112 may not be engaged with holding member 160, enabling rotary section 112, including rotary member 132, to rotate with respect to holding member 160. Accordingly, engagement member 162 of holding member 160 may be prevented from moving rotationally as camming surface 146 of cam portion 140 rotates and moves along engagement member 162 during rotation of rotary member 132 about rotational axis AX1. Additionally, as shown in FIG. 5B, guide channel 168 may be longer than guide protrusion 166 such that guide protrusion 166 is free to move axially in directions D1 and D2 parallel or substantially parallel to rotational axis AX1. Accordingly, as holding member 160 is forced against spring 150 in direction D2 towards second end 138B of hinge assembly 110 by camming surface 146 during rotation of rotary member 132 (see FIG. 5A), each guide protrusion 166 may move axially along a corresponding guide channel 168 of stationary cover 118 while being prevented from moving rotationally with respect to stationary section 114 and stationary member 152.

Figure 6A:
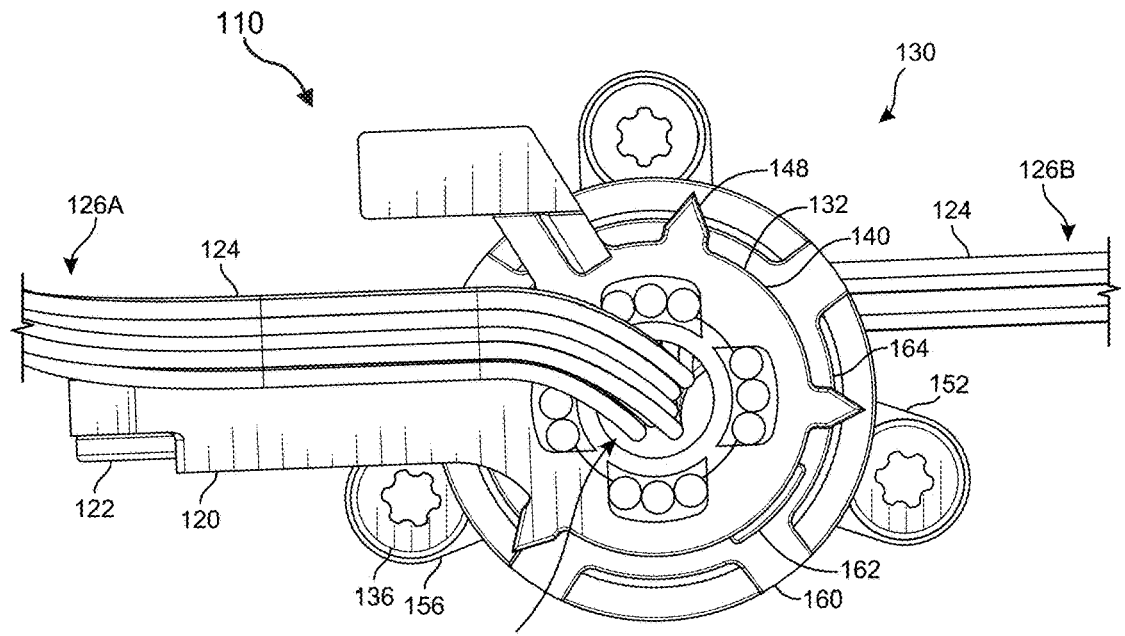
FIG. 6A is a top view of an exemplary hinge assembly with a rotary section oriented in a selected orientation relative to a stationary section according to embodiments of this disclosure.
Figure 6B:
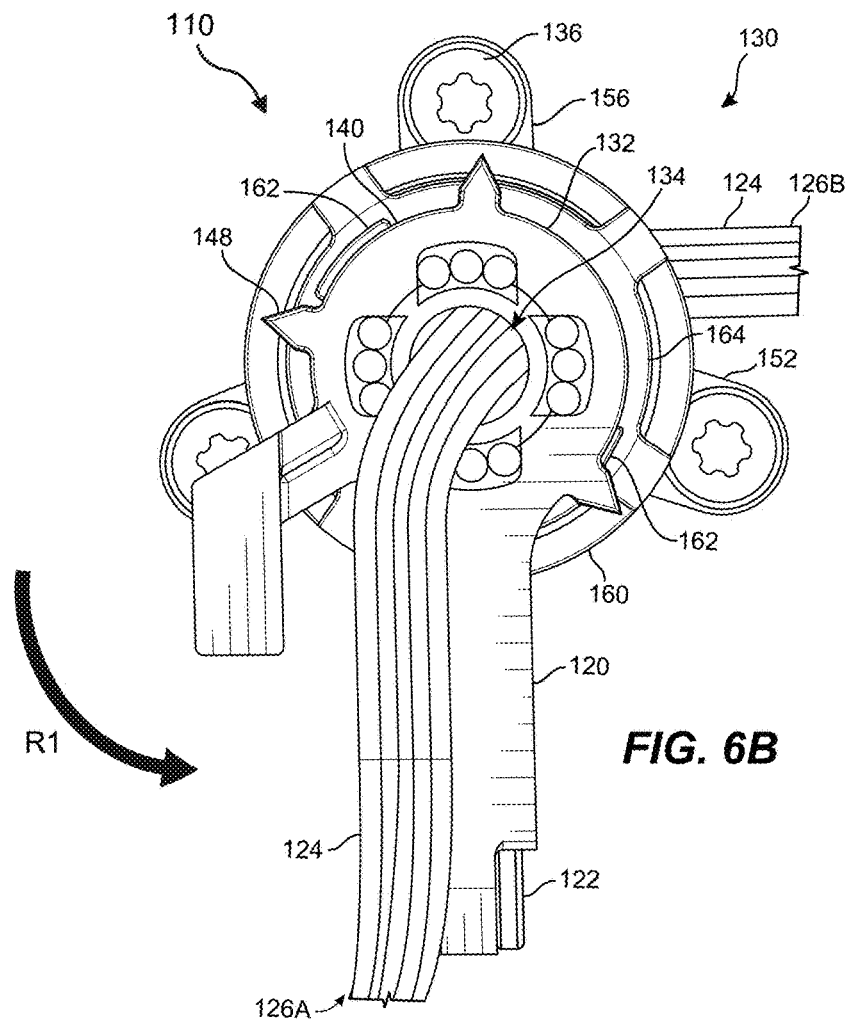
FIG. 6B is a top view of the exemplary hinge assembly of FIG. 6A with the rotary section oriented in another selected orientation relative to the stationary section.

FIGS. 6A and 6B show an overhead view of internal assembly 130 of hinge assembly 110, as illustrated in FIG. 5A, with rotary member 132 disposed in different positional states relative to stationary member 152. FIG. 6A illustrates rotary member 132 in an open corresponding to that shown FIG. 4B and FIG. 6B illustrates rotary member 132 in a closed position corresponding to that shown in FIG. 4A. As shown, when rotary member 132 is rotated, for example, in rotational direction R1 from the open position in FIG. 6A to the closed position in FIG. 6B, holding member 160 may be rotationally constrained in conjunction with stationary member 152. Accordingly, cam portion 140 of rotary member 132 may rotate relative to engagement member 162 of holding member 160 such that camming surface 146 of cam portion 140 forces axial movement of holding member 160 in directions parallel to the rotational axis AX1 (e.g., in directions D1 and D2 shown in FIG. 5B).

FIG. 7 illustrates portions of internal assembly 130 of hinge assembly 110 with spring 150 and holding member 160 removed to show additional details of the assembly, including certain details cam portion 140 of rotary member 132. As shown in this figure, rotary barrel portion 142 of rotary member 132 may be rotatably disposed within a cylindrical inner cavity of stationary barrel portion 158 of stationary member 152. Rotary barrel portion 142 may pass through stationary barrel portion 158 to second end 138B of internal assembly 130 and may be secured to stationary member 152 by, for example, retaining element 144 (e.g., a retaining clip, such as an E-clip). In some examples, retaining element 144 and rotary barrel portion 142 may be integrally formed as a single piece, with retaining element 144 protruding radially outward as a collar at second end 138B. In this example, rotary barrel portion 142 of rotary member 132 may be inserted through stationary barrel portion 158 of stationary member 152. Cam portion 140 may then be positioned against rotary barrel portion 142 at first end 138A in a fixture and cam portion 140 may be laser welded to rotary barrel portion 142 (additional components, such as spring 150 and/or holding member 160 shown in FIGS. 5A, may also be assembled with rotary member 132 and stationary member 152 prior to the laser welding). Wiring passage 134 may be defined within rotary barrel portion 142 and may extend axially through rotary barrel portion 142 from first end 138A to second end 138B. Cables 124 may pass through wiring passage 134, which may have a cylindrical or substantially cylindrical shape to protect cables 124 from damage and wear while allowing for a limited range of movement of cables 124 during operation of hinge assembly 110.

As additionally shown in FIG. 7, cam portion 140 of rotary member 132 may include at least one camming surface 146 located around an outer portion of rotary barrel portion 142 near first end 138A of internal assembly 130. In some examples, cam portion 140 may include a plurality of camming surfaces 146. For example, cam portion 140 may include a pair of camming surfaces 146 that are located on radially opposite sides of rotary barrel portion 142, with each of the two camming surfaces 146 positioned and configured to engage with a corresponding engagement member 162 of a pair of engagement members 162 of holding member 160 (see, e.g., the pair of engagement members 162 in FIG. 6B).

Camming surface 146 may include at least two engagement recesses for engaging an abutting engagement member 162 so as to hold rotary member 132 and a temple 106 coupled thereto in a predetermined position relative to stationary member 152. For example, camming surface 146 may define an open-position engagement recess 170 configured to hold rotary member 132 in an open position (see, e.g., FIG. 6A). Additionally, camming surface 146 may define a closed-position engagement recess 172 configured to hold rotary member 132 in a closed position (see, e.g., FIG. 6B). Open-position engagement recess 170 and closed-position engagement recess 172 may be recesses with apical portions located nearest first end 138A and furthest from base portion 154 of stationary member 152. Portions of open-position engagement recess 170 and closed-position engagement recess 172 adjacent the apical portions may be sloped such that spring 150 shown in FIG. 5 forces engagement member 162 of holding member 160 into abutment with a corresponding apical portion so as to engage with and hold rotary member 132 in a particular positional state.

Spring 150 may be extended to its maximum extent within hinge assembly 110 when engagement member 162 is positioned within the apical portion of open-position engagement recess 170 or closed-position engagement recess 172. In some examples, spring 150 may be at least partially compressed while positioned in either of these apical portions such that is not necessarily in a resting position. The apical portions of open-position engagement recess 170 and closed-position engagement recess 172 may act as detents configured to hold rotary member 132 in a selected open or closed position when no rotational torque is applied to rotary member 132. Additionally, the sloped portions of camming surface 146 adjacent each of the apical portions of open-position engagement recess 170 and closed-position engagement recess 172 may act to urge rotary member 132 into the selected positional state as a spring force applied by spring 150 causes engagement member 162 of holding member 160 to push against the abutting sloped portion so as to cause rotation of rotary member 132 until engagement member 162 comes to rest securely in the adjacent apical portion of open-position engagement recess 170 or closed-position engagement recess 172.

Camming surface 146 may also include a sloped transition region 174 located between open-position engagement recess 170 and closed-position engagement recess 172. Sloped transition region 174 may slope away from the apical portions of open-position engagement recess 170 and closed-position engagement recess 172 such that sloped transition region 174 is disposed closer to base portion 154 of stationary member 152. Accordingly, as rotary member 132 is rotated between the open and closed positional states, a sloped portion of sloped transition region 174 may force engagement member 162 of holding member 160 toward base portion 154 of stationary member 152, producing a counterforce against spring 150 and causing spring 150 to be further compressed between spring interface portion 164 of holding member 160 and base portion 154. Spring 150 may exert additional spring force against holding member 160 as engagement member 162 slides along sloped transition region 174 so that at least a threshold amount of torque may be required to rotate rotary member 132 to a degree sufficient to advance a peak portion of sloped transition region 174 (i.e., a portion of sloped transition region 174 disposed closest to base portion 154 of stationary member 152) past engagement member 162. In some embodiments, spring 150 may exert a peak force (i.e., a maximum spring force) within hinge assembly 110 when engagement member 162 is positioned against the peak portion of sloped transition region 174. The threshold amount of torque required may depend on various factors, such as the dimensions and location of camming surface 146, the proximity of rotary member 132 to spring 150, stationary member 152, and holding member 160, and/or the dimensions, material properties, and compressional state of spring 150.

In some examples, components of hinge assembly 110 may be configured such that a threshold amount of torque required to rotate rotary section 112, including rotary member 132, between the open and closed positions is approximately 0.2 newton-meters (i.e., 0.20 Nm±0.03 Nm). In some examples, the threshold amount of torque may be between approximately 0.1 Nm and approximately 0.3 Nm (e.g., approximately 0.1 Nm, approximately 0.15 Nm, approximately 0.2 Nm, approximately 0.25 Nm, approximately 0.3 Nm). In at least one example, components of hinge assembly 110 may be configured such that spring 150 applies a peak force to holding member 160 of approximately 80 newtons (i.e., 80 N±5 N). For example, the peak force and/or range of forces exerted by spring 150 in hinge assembly 110 may be between approximately 20 N and approximately 150 N (e.g., approximately 20 N, approximately N, approximately 30 N, approximately 35 N, approximately 40 N, approximately 45 N, approximately 50 N, approximately 55 N, approximately 60 N, approximately 65 N, approximately N, approximately 75 N, approximately 80 N, approximately 85 N, approximately 90 N, approximately 95 N, approximately 100 N, approximately 110 N, approximately 120 N, approximately 130 N, approximately 140 N, approximately 150 N).

According to various embodiments, camming surface 146 may additionally include an over-extension region 176 (i.e., an over-torque region) located adjacent open-position engagement recess 170. For example, over-extension region 176 may extend from a side of open-position engagement recess 170 that is opposite a side extending to sloped transition region 174. Over-extension region 176 may allow for a limited amount of rotation of rotary member 132 of rotary section 112 beyond the open position to an over-extension position (see, e.g., FIG. 4C). As discussed above, a user may over-extend rotary sections 112 of hinge assemblies 110 by forcing temples 106 of head-mounted device 100 outward from each other to facilitate donning of head-mounted device 100. The user may then release a force applied to temples 106, after which temples 106 may each return to an open position with engagement member 162 secured within open-position engagement recess 170. As shown in FIG. 7, over-extension region 176 may slope away from open-position engagement recess 170 to an end surface 178 that is disposed closer to base portion 154 of stationary member 152 than a peak portion of sloped transition region 174.

Over-extension region 176 may also be configured to apply a clamping force to a user's head via temples 106 to securely fix head-mounted device 100 in place when worn. For example, the space between left- and right-side temples 106 when these temples are each in the open position (see, e.g., FIG. 1) may be less than a space required to accommodate a user's head. As such, temples 106 may be forced outward from each other when worn such that rotary sections 112 of left- and right-side hinges 108 are rotationally over-extended beyond their open positions when worn. In these examples, over-extension regions 176 of left- and right-side hinges 108 may apply biasing forces pushing temples 106 rotationally inward against opposite sides of the user's head. Thus, head-mounted device 100 may be more securely held on the heads of users due to the clamping forces applied by the over-extended hinges 108 during wear. In at least one example, each hinge 108 may be configured to provide selected amounts of torque when engagement member 162 of holding member 160 is positioned at various locations along over-extension region 176. For example, hinge 108 may be tuned such that the torque in the over-extension region 176 is linear or substantially linear. The slope of over-extension region 176 may, for example, be configured, in conjunction with spring 150, to exert a constant or substantially constant torque (e.g., a constant torque equal to between approximately 0.1 Nm and 0.3 Nm, such as approximately 0.2 Nm) when engagement member 163 is positioned at any point along at least a portion of over-extension region 176. In certain examples, over-extension region 176 may configured to exert an increasing torque as hinge assembly 110 approaches the maximum extension angle.

In various embodiments, the user may be prevented from over-torqueing rotary member 132 beyond a specified amount (e.g., a maximum over-extension of between approximately 5° and approximately 20° beyond the open position). For example, rotary cover 116 and/or stationary cover 118 may include a hard stop feature that prevents rotation beyond a certain point. In one example, stationary cover 118 may include at least one surface portion that interfaces with holding member 160 to prevent movement of holding member 160 toward stationary member 152 beyond a certain point (e.g., in direction D2 shown in FIG. 5B), thus preventing further rotation of rotary member 132 beyond a specified degree of over-extension. In at least one example, rotary cover 116 and stationary cover 118 may include corresponding stop features that engage each other at a certain point to limit over-extension beyond a specified position. Additionally or alternatively, at a location along over-extension region 176 before engagement member 162 reaches end surface 178, spring 150 may become fully compressed or may require a significant amount of additional force to further compress, thereby preventing the user from further rotating rotary member 132 with respect to stationary member 152 and preventing engagement member 162 from reaching end surface 178. In at least one example, spring 150 may exert a force of between approximately 20 N and approximately 60 N when engagement member 162 of holding member 160 is positioned in open-position engagement recess 170 and/or closed-position engagement recess 172. Additionally, spring 150 may exert a maximum force of between approximately 60 N and approximately 150 N when rotary member 132 is fully over-extended (i.e., when engagement member 162 abuts over-extension region 176 at a position furthest from open-position engagement recess 170).

Since engagement member 162 of holding member 160 remains in contact with the sloped surface of over-extension region 176 when rotary member 132 is over-torqued by a user, rotary member 132 may be forced in an opposite rotational direction when the user releases the applied torque. For example, as engagement member 162 is forced against over-extension region 176 by spring 150, engagement member 162 may slide along and force rotary member 132 from the over-extended orientation toward the open position until engagement member 162 is positioned and held within the apical portion of open-position engagement recess 170. Accordingly, rotary member 132 may only be temporarily held in the over-extended position while the user applies additional torque to rotary member 132.

Figure 8A:
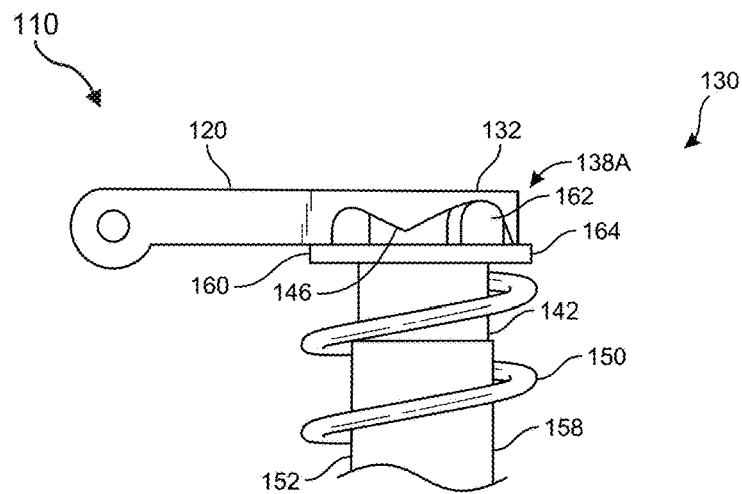
FIG. 8A is a side view of a portion of an exemplary hinge assembly with a rotary section oriented in a selected orientation relative to a stationary section according to embodiments of this disclosure.
Figure 8B:
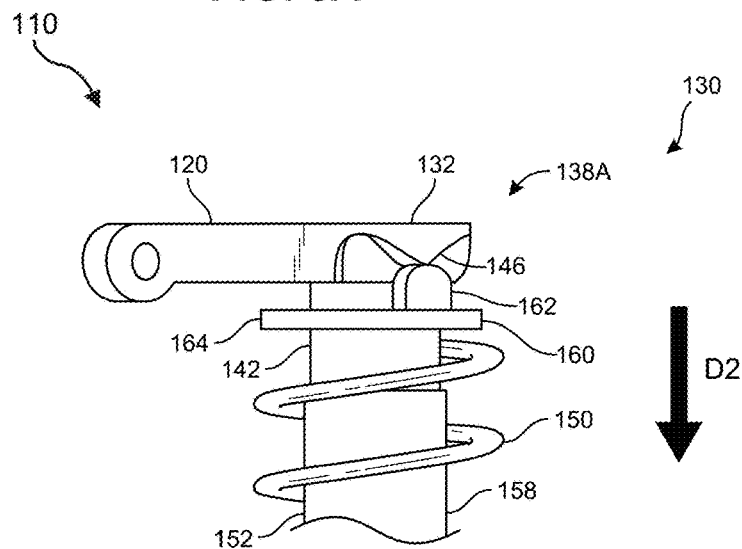
FIG. 8B is a side view of the portion of the exemplary hinge assembly of FIG. 8A with the rotary section oriented in another selected orientation relative to the stationary section.
Figure 8C:
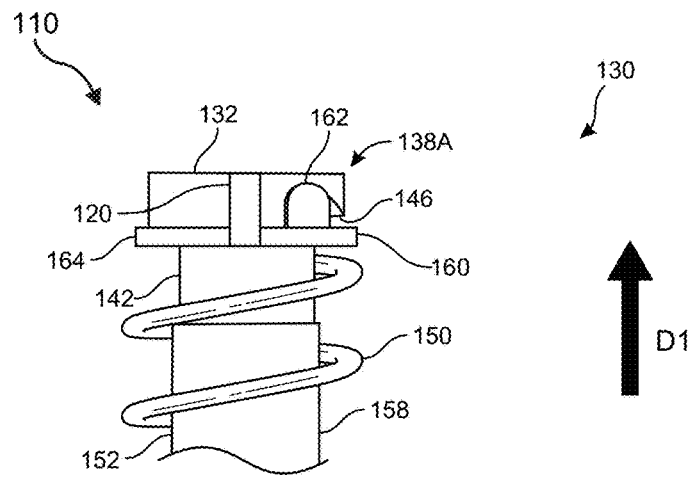
FIG. 8C is a side view of the portion of the exemplary hinge assembly of FIG. 8A with the rotary section oriented in another selected orientation relative to the stationary section.

FIGS. 8A-8C illustrate internal assembly 130 of hinge assembly 110 with rotary member 132 in different positional states with respect to stationary member 152. Certain portions of internal assembly 130, such as portions of holding member 160 including guide protrusions 166, are not shown in these figures to provide a clearer view of the arrangement and configuration of certain portions of internal assembly 130. FIG. 8A shows rotary member 132 disposed in an open position (see, e.g., FIG. 6A) with engagement member 162 of holding member 160 disposed within open-position engagement recess 170 defined by camming surface 146 (see, e.g., FIG. 7). Engagement member 162 may be securely held within open-position engagement recess 170 by a biasing force applied by spring 150 to spring interface portion 164 of holding member 160. As shown, spring 150 may include coils that helically wrap around outer surfaces of rotary barrel portion 142 of rotary member 132 and stationary barrel portion 158 of stationary member 152. Ends of spring 150 may abut spring interface portion 164 and base portion 154 of stationary member 152 (see, e.g., FIGS. 5 and 7). In various examples, holding member 160 may be prevented from rotating with respect to stationary member 152 by, for example, one or more guide protrusions 166 of holding member 160 that are disposed within and rotationally constrained by corresponding guide channels 168 defined within a stationary cover 118 of stationary section 114 (see, e.g., FIGS. 5A and 5B).

FIG. 8B shows rotary member 132 disposed in a transitional position as rotary member 132 is rotated from the open position to a closed position. As shown, engagement member 162 may be rotationally constrained such that rotary member 132 rotates with respect to engagement member 162. Engagement member 162 may be forced in axial direction D2 by sloped transition region 174 of camming surface 146 (see, e.g., FIG. 7), with FIG. 8B illustrating engagement member 162 abutting a peak portion of sloped transition region 174. As engagement member 162 is forced in direction D2, spring interface portion 164 of holding member 160 may transfer the force to spring 150 such that spring 150 is further compressed. The amount of torque applied by a user to rotary member 132 may be an amount sufficient to forcefully compress spring 150 so as to allow sloped transition region 174 of camming surface 146 to rotationally move past engagement member 162.

FIG. 8C shows rotary member 132 disposed in a closed position (see, e.g., FIG. 6B) with engagement member 162 disposed within closed-position engagement recess 172 defined by camming surface 146 (see, e.g., FIG. 7). In the closed position, rotary member 132 may be oriented at an angular distance of approximately 90° from the open position shown in FIG. 8A. With engagement member 162 disposed within closed-position engagement recess 172, spring 150 may be elongated with respect to the compressed state of spring 150 shown in FIG. 8B. Engagement member 162 may be securely held within closed-position engagement recess 172 by a biasing force applied by spring 150 to spring interface portion 164 of holding member 160.

Figure 9A:
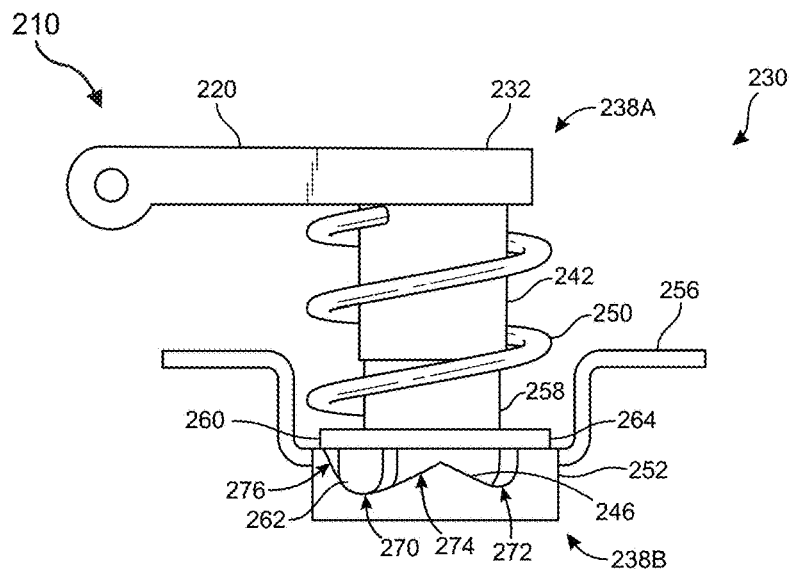
FIG. 9A is a side view of a portion of an exemplary hinge assembly with a rotary section oriented in a selected orientation relative to a stationary section according to embodiments of this disclosure.
Figure 9B:
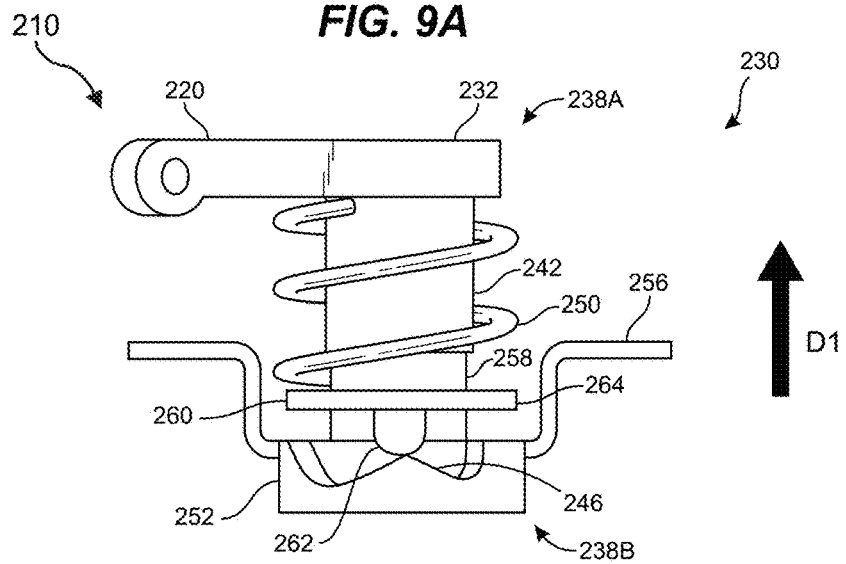
FIG. 9B is a side view of the portion of the exemplary hinge assembly of FIG. 9A with the rotary section oriented in another selected orientation relative to the stationary section.
Figure 9C:
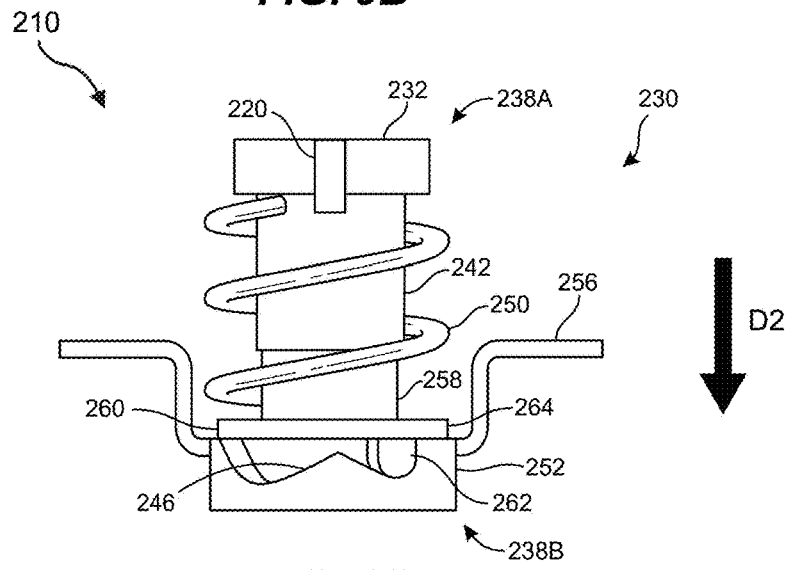
FIG. 9C is a side view of the portion of the exemplary hinge assembly of FIG. 9A with the rotary section oriented in another selected orientation relative to the stationary section.

FIGS. 9A-9C show various positional states of a hinge assembly 210 in accordance with certain embodiments of the disclosure. In the example shown in these figures, an internal assembly 230 of hinge assembly 210 is depicted. FIG. 9A, for example, shows that internal assembly 230 includes a rotary member 232 that is rotatable with respect to a stationary member 252 that is configured to be mounted to frame 104 of head-mounted device 100 (see, e.g., FIG. 1) via, for example, screws or bolts extending through one or more mounting portions 256 of stationary member 252. For example, mounting portions 256 may be secured to a stationary cover, such as stationary cover 118 shown in FIGS. 2 and 3, that is coupled to frame 104 of head-mounted device 100. Additionally, a temple 106 may be coupled to, for example, an extension arm 220 of rotary member 232

In contrast to other disclosed embodiments of hinge assemblies 110 that include a holding member 160 that is rotationally constrained as rotary member 132 rotates relative to holding member 160, hinge assembly 210 shown in FIGS. 9A-9C may instead include a holding member 260 that is coupled to rotary member 232 such that an engagement member 262 of holding member 260 rotates in conjunction with rotation of rotary member 232. For example, holding member 260 may include guide protrusions (see, e.g., guide protrusions 166 illustrated in FIGS. 5A and 5B) that are coupled to rotary member 232 via, for example, corresponding guide channels defined in a rotary cover coupled to rotary member 232 (see, e.g., rotary cover 116 shown in FIGS. 2-4C and guide protrusions 166 in FIGS. 5A and 5B). Such guide protrusions and guide channels may force rotation of holding member 260 in conjunction with rotation of rotary member 232 while also allowing holding member 260 to move axially in a direction parallel or substantially parallel to a rotational axis of rotary member 232 in response to forces applied by spring 250 and/or a user (see, e.g., FIGS. 3-5).

FIG. 9A shows internal assembly 230 of hinge assembly 210 with rotary member 232 disposed in an open position. As shown, portions of rotary member 232 may be rotationally coupled to and/or engaged with corresponding portions of stationary member 252. For example, a rotary barrel portion 242 of rotary member 232 may be disposed within or around a stationary barrel portion 258 of stationary member 252 such that rotary member 232 and holding member 260 are rotatable with respect to stationary member 252. A wiring passage for electrical cables and/or other suitable signal transmission cables may extend through rotary member 232 and/or stationary member 252 between first end 238A and second end 238B. In various embodiments, stationary member 252 may include a camming surface 246 facing generally toward holding member 260. As shown in FIG. 9A, engagement member 262 of holding member 260 may be disposed within and engaged with an open-position engagement recess 270 defined by camming surface 246. In some examples, engagement member 262 may be forced into abutment with portions of camming surface 246, such as open-position engagement recess 270, by a biasing member, such as spring 250. In some examples, camming surface 246 may also include an over-extension region 276 that slopes away from open-position engagement recess 270. Over-extension region 276 may allow for a limited amount of rotation of rotary member 232 beyond the open position to an over-extension position (e.g., the over-extension position shown in FIG. 4C as rotary member 132 is rotated in rotational direction R2).

FIG. 9B shows rotary member 232 disposed in a transitional position as rotary member 232 is rotated from the open position to a closed position. As shown, engagement member 262 may rotate (e.g., in rotational direction R1 shown in FIG. 6B) with respect to stationary member 252 in conjunction with rotation of rotary member 232, to which engagement member 262 is coupled via, for example, a rotary cover (see, e.g., rotary cover 116 in FIGS. 2-4C). Engagement member 262 may be forced in axial direction D1 by a sloped transition region 274 of camming surface 246 (see FIG. 9A), with FIG. 9B showing engagement member 262 abutting a peak portion of sloped transition region 274. As engagement member 262 is forced in direction D1 by sloped transition region 274, spring interface portion 264 of holding member 260 may further compress spring 250. The amount of torque applied by a user to rotary member 232 via an attached temple 106 may be an amount sufficient to forcefully compress spring 250 so as to allow engagement member 262 to rotationally move past sloped transition region 274 of camming surface 246.

FIG. 9C shows rotary member 232 disposed in a closed position (see, e.g., FIG. 6B) with engagement member 262 disposed within a closed-position engagement recess 272 defined by camming surface 246 (see FIG. 9A). As engagement member 262 moves rotationally in conjunction with rotary member 232 and slides along a sloped surface portion of camming surface 246 from sloped transition region 274 to closed-position engagement recess 272, engagement member 262 may also be forced axially in direction D2 by spring 250 until engagement member 262 reaches closed-position engagement recess 272, where engagement member 262 may be securely held within closed-position engagement recess 272 by a biasing force (e.g., a spring force) exerted by spring 250. In the closed position, rotary member 232 may be oriented at an angular distance of approximately 90° from the open position shown in FIG. 9A. With engagement member 262 disposed within closed-position engagement recess 272, spring 250 may be elongated with respect to the compressed state of spring 250 shown in FIG. 9B.

Figure 10:
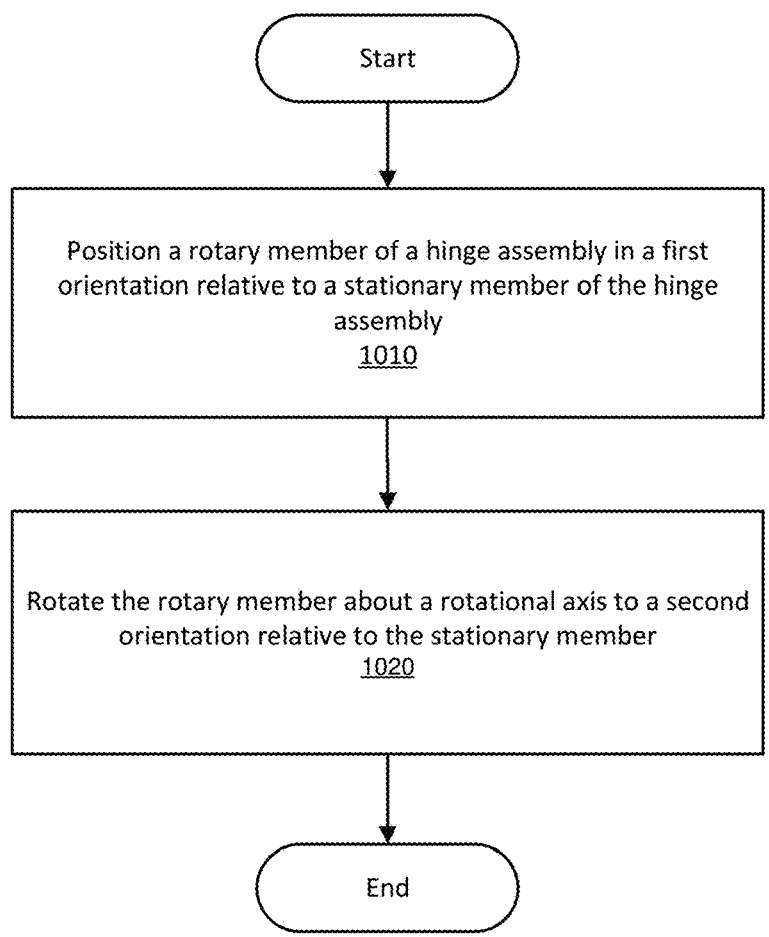
FIG. 10 is a flow diagram of an exemplary method for operating a hinge assembly in accordance with embodiments of this disclosure.

FIG. 10 is a flow diagram of an exemplary method 1000 for operating a hinge assembly in accordance with embodiments of this disclosure. As illustrated in FIG. 10, at step 1010, a rotary member of a hinge assembly may be positioned in a first orientation relative to a stationary member of the hinge assembly. The devices and apparatuses described herein may perform step 1010 in a variety of ways. In one embodiment, rotary member 132 of hinge assembly 110 may be positioned in a first orientation (e.g., an open position or a closed position) relative to stationary member 152 of hinge assembly 110 (see, e.g., FIGS. 2-8C; see also FIGS. 9A-9C).

In this example, the hinge assembly may include (1) a wiring passage defined within the stationary member and the rotary member, the wiring passage surrounding and extending along a rotational axis, (2) at least one electrical and/or optical cable passing through the wiring passage, and (3) a biasing member that applies a biasing force to hold the rotary member in the first orientation. For example, hinge assembly 110 may include wiring passage 134 defined within stationary member 152 and rotary member 132, with wiring passage 134 surrounding and extending along a rotational axis AX1 (see, e.g., FIGS. 4A-7). Cables 124 may pass through wiring passage 134 and a biasing member, such as spring 150, may apply a biasing force (e.g., in direction D1) to hold the rotary member in the first orientation (see, e.g., FIGS. 2-8C; see also FIGS. 9A-9C).

At step 1020 in FIG. 10, the rotary member may be rotated about the rotational axis to a second orientation relative to the stationary member. The devices and apparatuses described herein may perform step 1020 in a variety of ways. In one embodiment, rotary member 132 may be rotated about rotational axis AX1 to a second orientation relative to stationary member 152. For examples, rotary member 132 may be rotated in rotational direction R1 from an open position to a closed position or rotary member 132 may be rotated in rotational direction R2 from a closed position to an open position and/or from the open position to an over-extended position (see, e.g., FIGS. 4A-4C, 6A, 6B, and 8A-8C; see also FIGS. 9A-9C).

According to some embodiments, rotating the rotary member about the rotational axis may include applying a torque to the rotary member that generates a counterforce against the biasing member in opposition to the biasing force. For example, rotating rotary member 132 about rotational axis AX1 may include applying a torque (e.g., via a coupled temple 106) to rotary member 132 that generates a counterforce (e.g., in direction D2 opposite direction D1) against spring 150 in opposition to the biasing force.

The present disclosure is generally directed to headset display devices, such as augmented-reality glasses, having hinge assemblies that connect frames and temples of the devices. In some embodiments, as described herein, a hinge assembly may include a stationary member coupled to a frame for mounting lenses and a rotary member that is coupled to a temple and that is rotatable with respect to the stationary member about a rotational axis. A wiring passage extending along the rotational axis may be defined within the stationary member and the rotary member. At least one cable for connecting electrical components in the temple to components in the frame may pass through the wiring passage. The hinge assembly may also include a biasing member, such as a compression spring, surrounding at least a portion of the wiring passage and positioned to apply a biasing force to hold the rotary member and the coupled temple in one of a plurality of selected orientations (e.g., an open or closed orientation) relative to the stationary member.

Hinge assemblies and systems, as disclosed herein, may provide various advantages for devices (e.g., artificial-reality headsets, such as augmented-reality glasses) that include such assemblies and systems. In some examples, the disclosed hinge assemblies may provide a range of motion that enables a variety of users to easily don and comfortably wear the headsets while also allowing for the temples to be folded inward towards the frames for convenient storage when not worn. The hinge assemblies may allow for simplified user operation while securely holding the temples in selected orientations. Additionally, the hinge assemblies may enable the temples, including rigid temples with limited or no flexibility, to be rotated and over-extended outwardly by users to facilitate donning and doffing of the headsets as well as to provide a clamping force against sides of the users' heads to more securely hold the headsets in position when worn. In contrast to conventional spring-actuated hinges, the disclosed hinge assemblies may provide passage for electrical wiring that connects electronic components in the temples to components in the frames and/or display lenses mounted to the frames. Accordingly, the space requirements for the frames may be minimized since bulkier components, such as batteries, storage media, ports, etc., may be positioned in the headset temples rather than in the headset frames worn on the user's face. Wiring cables may be safely and discretely secured within the hinge assemblies such that the cables are slightly twisted during rotation of the hinge assemblies rather than being stretched or sharply bent so as to preserve the integrity of the cables over an extended period of use.

Example Embodiments

Example 1: A hinge assembly may include (1) a stationary member, (2) a rotary member that is rotatable with respect to the stationary member about a rotational axis, (3) a wiring passage defined within the stationary member and the rotary member, the wiring passage surrounding and extending along the rotational axis, and (4) a biasing member surrounding at least a portion of the wiring passage and positioned to apply a biasing force to hold the rotary member in one of a plurality of selected orientations relative to the stationary member, wherein the wiring passage is configured to accommodate at least one cable passing therethrough.

Example 2: The hinge assembly of Example 1, wherein the hinge assembly may further include a holding member having (1) a biasing interface portion that abuts the biasing member and (2) an engagement member that is forced by the biasing member into one of a plurality of engagement recesses defined by the rotary member or the stationary member to hold the rotary member in the selected orientation relative to the stationary member.

Example 3: The hinge assembly of Example 2, wherein each of the plurality of engagement recesses may be at least partially defined by a camming surface of the rotary member or the stationary member and the engagement member is slidable along the camming surface between the plurality of engagement recesses during rotation of the rotary member with respect to the stationary member.

Example 4: The hinge assembly of Example 3, wherein the camming surface further may include a sloped transition region between two engagement recesses of the plurality of engagement recesses, the sloped transition region protruding toward the biasing member such that the biasing interface portion of the holding member is moved in a direction opposite a direction of the biasing force applied by the biasing member as the engagement member slides along the sloped transition region.

Example 5: The hinge assembly of Example 4, wherein the camming surface may further include an over-extension region that extends from a side of one of the two engagement recesses opposite the sloped transition region, the over-extension region protruding toward the biasing member such that the biasing interface portion of the holding member is moved in the direction opposite the direction of the biasing force applied by the biasing member as the engagement member slides along the over-torque region.

Example 6: The hinge assembly of Example 3, wherein the engagement member may protrude from biasing interface portion toward the camming surface.

Example 7: The hinge assembly of Example 2, wherein the holding member may be rotationally constrained by the stationary member to prevent rotation of the holding member with respect to the stationary member about the rotational axis while allowing for movement of the holding member in a direction substantially parallel to the rotational axis.

Example 8: The hinge assembly of Example 1, wherein the biasing member may apply the biasing force in a direction substantially parallel to the rotational axis.

Example 9: The hinge assembly of Example 1, wherein the biasing member may include a spring surrounding a portion of at least one of the stationary member or the rotary member.

Example 10: The hinge assembly of Example 9, wherein the spring may be at least partially compressed between a surface of the stationary member and an opposing surface of the rotary member.

Example 11: The hinge assembly of Example 9, wherein the spring may exhibit a peak force of from approximately 20 N to approximately 150 N.

Example 12: The hinge assembly of Example 1, wherein at least one of the stationary member or the rotary member may include a barrel portion surrounding the wiring passage.

Example 13: A head-mounted device may include (1) a frame, (2) a temple extending from a peripheral region of the frame, (3) at least one cable communicatively coupled to each of the temple and the frame, and (4) a hinge assembly coupling the temple to the frame, the hinge assembly including (i) a stationary member coupled to the frame, (ii) a rotary member coupled to the temple and rotatable with respect to the stationary member about a rotational axis, (iii) a wiring passage defined within the stationary member and the rotary member, the wiring passage surrounding and extending along the rotational axis, wherein the at least one cable passes through the wiring passage, and (iv) a biasing member surrounding at least a portion of the wiring passage and positioned to apply a biasing force to hold the rotary member in one of a plurality of selected orientations relative to the stationary member.

Example 14: The head-mounted device of Example 13, wherein the hinge assembly may further include a holding member having (1) a biasing interface portion that abuts the biasing member and (2) an engagement member that is forced by the biasing member into one of a plurality of engagement recesses defined by the rotary member or the stationary member to hold the rotary member in the selected orientation relative to the stationary member.

Example 15: The head-mounted device of Example 13, wherein the rotary member may include an extension arm that is secured to the temple, the extension arm extending longitudinally in a direction substantially perpendicular to the rotational axis.

Example 16: The head-mounted device of Example 13, wherein the at least one cable may extend through the wiring passage in a direction that is nonparallel to portions of the at least one cable disposed outside the wiring passage.

Example 17: The head-mounted device of Example 13, wherein the at least one cable may be configured to transmit at least one of a data signal or power between at least one electronic component of the temple and at least one electronic component of the frame.

Example 18: The hinge assembly of Example 13, wherein the at least one cable may include an electrical cable or an optical cable.

Example 19: A method may include (1) positioning a rotary member of a hinge assembly in a first orientation relative to a stationary member of the hinge assembly and (2) rotating the rotary member about the rotational axis to a second orientation relative to the stationary member. The hinge assembly may include (i) a wiring passage defined within the stationary member and the rotary member, the wiring passage surrounding and extending along a rotational axis, (ii) at least one cable passing through the wiring passage, and (iii) a biasing member that applies a biasing force to hold the rotary member in the first orientation.

Example 20: The method of Example 19, wherein rotating the rotary member about the rotational axis may include applying a torque to the rotary member that generates a counterforce against the biasing member in opposition to the biasing force.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11, head-mounted display device 100 in FIG. 1, and/or a mixed-reality system) or that visually immerses a user in an artificial reality (such as, e.g., a virtual-reality system). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
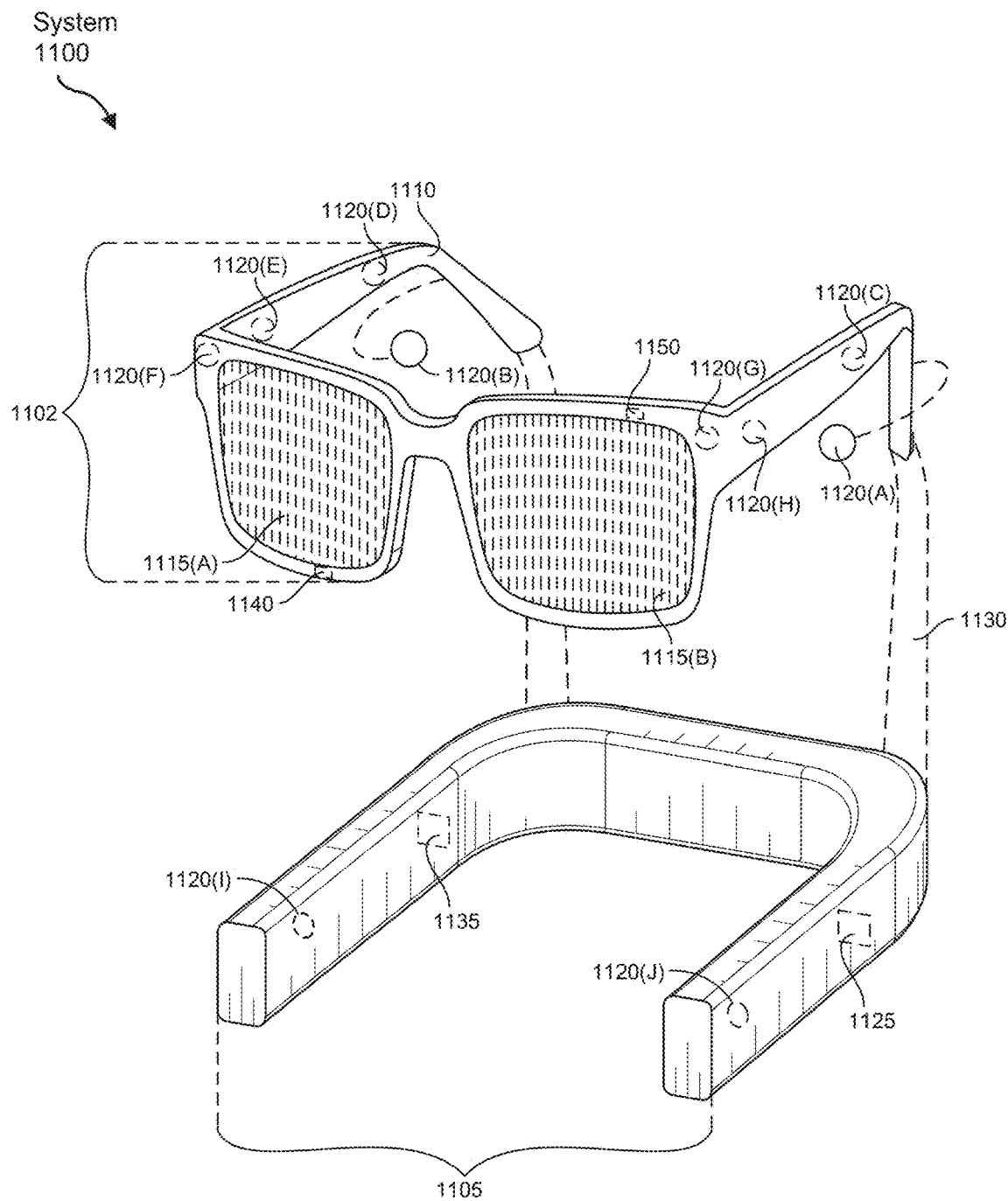
FIG. 11 is an illustration of exemplary augmented-reality glasses according to embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140.

Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(F) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a Bluetooth connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system that mostly or completely covers a user's field of view.

Artificial-reality systems may include a variety of types of visual feedback mechanisms. For example, display devices in augmented-reality system 1100 and/or a virtual-reality system may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 1100 and/or a virtual-reality system may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or a virtual-reality system may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Figure 12:
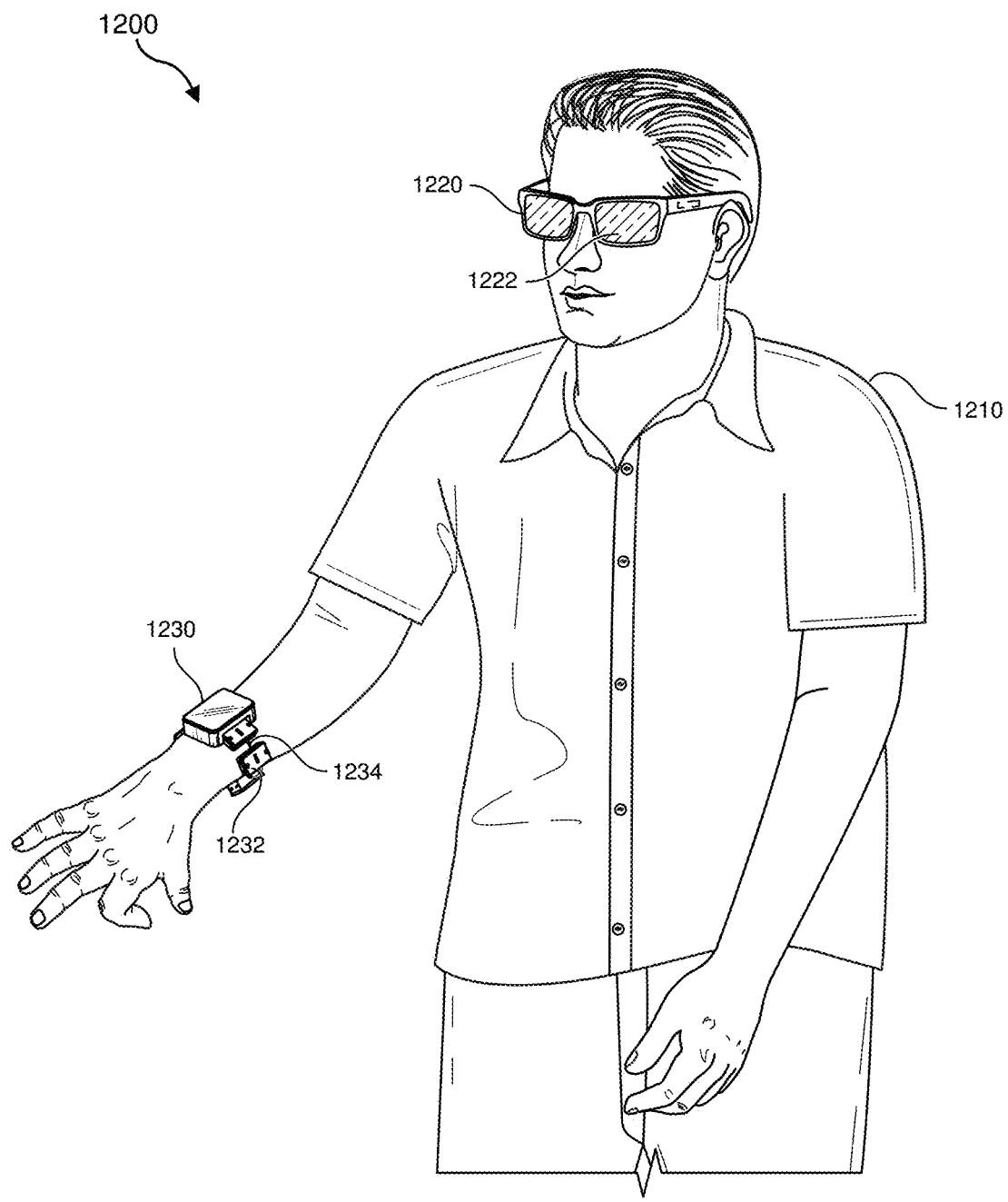
FIG. 12 is an illustration of an exemplary augmented-reality environment according to embodiments of this disclosure.

In some embodiments, augmented-reality systems may be used in conjunction with haptic interfaces, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Interactive feedback devices, such as haptic device 1230 may include any suitable number and/or type of haptic transducer, sensor, and/or feedback mechanism. For example, haptic device 1230 may include one or more mechanical transducers, piezoelectric transducers, and/or fluidic transducers. Haptic device 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

In some embodiments, the systems described herein may also include an eye-tracking subsystem designed to identify and track various characteristics of a user's eye(s), such as the user's gaze direction. The phrase "eye tracking" may, in some examples, refer to a process by which the position, orientation, and/or motion of an eye is measured, detected, sensed, determined, and/or monitored. The disclosed systems may measure the position, orientation, and/or motion of an eye in a variety of different ways, including through the use of various optical-based eye-tracking techniques, ultrasound-based eye-tracking techniques, etc. An eye-tracking subsystem may be configured in a number of different ways and may include a variety of different eye-tracking hardware components or other computer-vision components. For example, an eye-tracking subsystem may include a variety of different optical sensors, such as two-dimensional (2D) or 3D cameras, time-of-flight depth sensors, single-beam or sweeping laser rangefinders, 3D LiDAR sensors, and/or any other suitable type or form of optical sensor. In this example, a processing subsystem may process data from one or more of these sensors to measure, detect, determine, and/or otherwise monitor the position, orientation, and/or motion of the user's eye(s).

Figure 13:
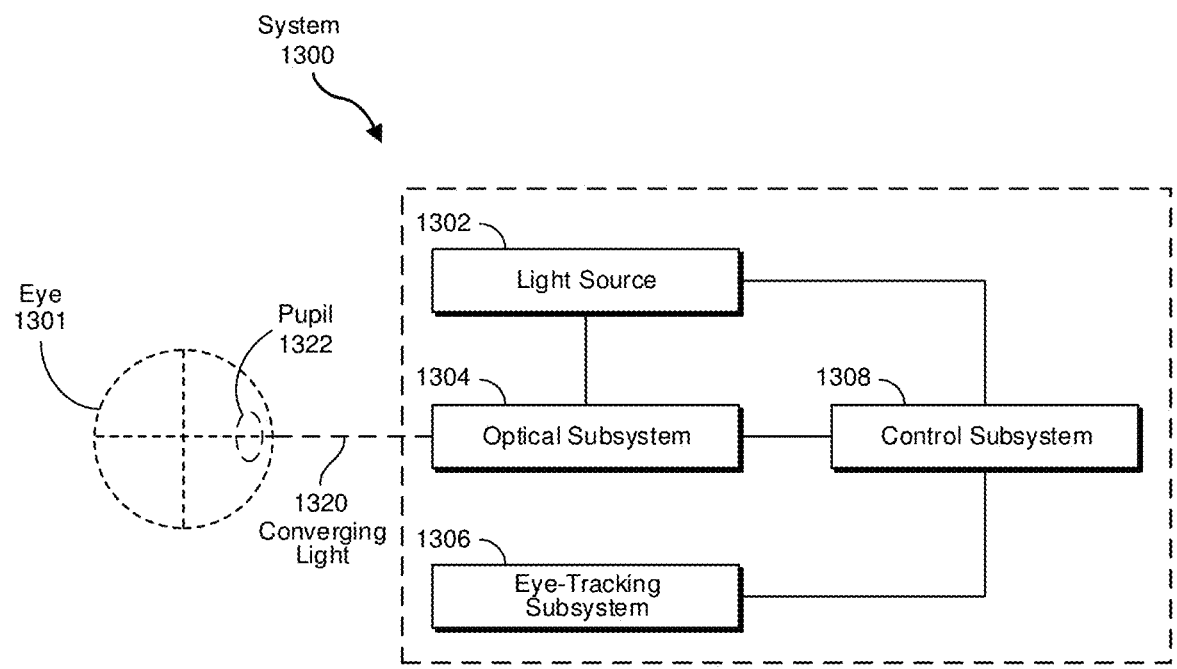
FIG. 13 an illustration of an exemplary system that incorporates an eye-tracking subsystem capable of tracking a user's eye(s).

FIG. 13 is an illustration of an exemplary system 1300 that incorporates an eye-tracking subsystem capable of tracking a user's eye(s). As depicted in FIG. 13, system 1300 may include a light source 1302, an optical subsystem 1304, an eye-tracking subsystem 1306, and/or a control subsystem 1308. In some examples, light source 1302 may generate light for an image (e.g., to be presented to an eye 1301 of the viewer). Light source 1302 may represent any of a variety of suitable devices. For example, light source 1302 can include a two-dimensional projector (e.g., a LCoS display), a scanning source (e.g., a scanning laser), or other device (e.g., an LCD, an LED display, an OLED display, an active-matrix OLED display (AMOLED), a transparent OLED display (TOLED), a waveguide, or some other display capable of generating light for presenting an image to the viewer). In some examples, the image may represent a virtual image, which may refer to an optical image formed from the apparent divergence of light rays from a point in space, as opposed to an image formed from the light ray's actual divergence.

In some embodiments, optical subsystem 1304 may receive the light generated by light source 1302 and generate, based on the received light, converging light 1320 that includes the image. In some examples, optical subsystem 1304 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 1320. Further, various mechanical couplings may serve to maintain the relative spacing and/or the orientation of the optical components in any suitable combination.

In one embodiment, eye-tracking subsystem 1306 may generate tracking information indicating a gaze angle of an eye 1301 of the viewer. In this embodiment, control subsystem 1308 may control aspects of optical subsystem 1304 (e.g., the angle of incidence of converging light 1320) based at least in part on this tracking information. Additionally, in some examples, control subsystem 1308 may store and utilize historical tracking information (e.g., a history of the tracking information over a given duration, such as the previous second or fraction thereof) to anticipate the gaze angle of eye 1301 (e.g., an angle between the visual axis and the anatomical axis of eye 1301). In some embodiments, eye-tracking subsystem 1306 may detect radiation emanating from some portion of eye 1301 (e.g., the cornea, the iris, the pupil, or the like) to determine the current gaze angle of eye 1301. In other examples, eye-tracking subsystem 1306 may employ a wavefront sensor to track the current location of the pupil.

Any number of techniques can be used to track eye 1301. Some techniques may involve illuminating eye 1301 with infrared light and measuring reflections with at least one optical sensor that is tuned to be sensitive to the infrared light. Information about how the infrared light is reflected from eye 1301 may be analyzed to determine the position(s), orientation(s), and/or motion(s) of one or more eye feature (s), such as the cornea, pupil, iris, and/or retinal blood vessels.

In some examples, the radiation captured by a sensor of eye-tracking subsystem 1306 may be digitized (i.e., converted to an electronic signal). Further, the sensor may transmit a digital representation of this electronic signal to one or more processors (for example, processors associated with a device including eye-tracking subsystem 1306). Eye-tracking subsystem 1306 may include any of a variety of sensors in a variety of different configurations. For example, eye-tracking subsystem 1306 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 1306 to track the movement of eye 1301. In another example, these processors may track the movements of eye 1301 by executing algorithms represented by computer-executable instructions stored on non-transitory memory. In some examples, on-chip logic (e.g., an application-specific integrated circuit or ASIC) may be used to perform at least portions of such algorithms. As noted, eye-tracking subsystem 1306 may be programmed to use an output of the sensor(s) to track movement of eye 1301. In some embodiments, eye-tracking subsystem 1306 may analyze the digital representation generated by the sensors to extract eye rotation information from changes in reflections. In one embodiment, eye-tracking subsystem 1306 may use corneal reflections or glints (also known as Purkinje images) and/or the center of the eye's pupil 1322 as features to track over time.

In some embodiments, eye-tracking subsystem 1306 may use the center of the eye's pupil 1322 and infrared or near-infrared, non-collimated light to create corneal reflections. In these embodiments, eye-tracking subsystem 1306 may use the vector between the center of the eye's pupil 1322 and the corneal reflections to compute the gaze direction of eye 1301. In some embodiments, the disclosed systems may perform a calibration procedure for an individual (using, e.g., supervised or unsupervised techniques) before tracking the user's eyes. For example, the calibration procedure may include directing users to look at one or more points displayed on a display while the eye-tracking system records the values that correspond to each gaze position associated with each point.

In some embodiments, eye-tracking subsystem 1306 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 1301 may act as a retroreflector as the light reflects off the retina, thereby creating a bright pupil effect similar to a red-eye effect in photography. If the illumination source is offset from the optical path, then the eye's pupil 1322 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 1308 may control light source 1302 and/or optical subsystem 1304 to reduce optical aberrations (e.g., chromatic aberrations and/or monochromatic aberrations) of the image that may be caused by or influenced by eye 1301. In some examples, as mentioned above, control subsystem 1308 may use the tracking information from eye-tracking subsystem 1306 to perform such control. For example, in controlling light source 1302, control subsystem 1308 may alter the light generated by light source 1302 (e.g., by way of image rendering) to modify (e.g., pre-distort) the image so that the aberration of the image caused by eye 1301 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as that provided by contact lenses worn by the user. In some embodiments, ophthalmic correction elements (e.g., adjustable lenses) may be directly incorporated into the artificial reality systems described herein. In some examples, the color of the user's eye may necessitate modification of a corresponding eye-tracking algorithm. For example, eye-tracking algorithms may need to be modified based at least in part on the differing color contrast between a brown eye and, for example, a blue eye.

FIG. 14 is a more detailed illustration of various aspects of the eye-tracking subsystem illustrated in FIG. 13. As shown in this figure, an eye-tracking subsystem 1400 may include at least one source 1404 and at least one sensor 1406.

Source 1404 generally represents any type or form of element capable of emitting radiation. In one example, source 1404 may generate visible, infrared, and/or near-infrared radiation. In some examples, source 1404 may radiate non-collimated infrared and/or near-infrared portions of the electromagnetic spectrum towards an eye 1402 of a user. Source 1404 may utilize a variety of sampling rates and speeds. For example, the disclosed systems may use sources with higher sampling rates in order to capture fixational eye movements of a user's eye 1402 and/or to correctly measure saccade dynamics of the user's eye 1402. As noted above, any type or form of eye-tracking technique may be used to track the user's eye 1402, including optical-based eye-tracking techniques, ultrasound-based eye-tracking techniques, etc.

Sensor 1406 generally represents any type or form of element capable of detecting radiation, such as radiation reflected off the user's eye 1402. Examples of sensor 1406 include, without limitation, a charge coupled device (CCD), a photodiode array, a complementary metal-oxide-semiconductor (CMOS) based sensor device, and/or the like. In one example, sensor 1406 may represent a sensor having predetermined parameters, including, but not limited to, a dynamic resolution range, linearity, and/or other characteristic selected and/or designed specifically for eye tracking.

As detailed above, eye-tracking subsystem 1400 may generate one or more glints. As detailed above, a glint 1403 may represent reflections of radiation (e.g., infrared radiation from an infrared source, such as source 1404) from the structure of the user's eye. In various embodiments, glint 1403 and/or the user's pupil may be tracked using an eye-tracking algorithm executed by a processor (either within or external to an artificial reality device). For example, an artificial reality device may include a processor and/or a memory device in order to perform eye tracking locally and/or a transceiver to send and receive the data necessary to perform eye tracking on an external device (e.g., a mobile phone, cloud server, or other computing device).

FIG. 14 shows an example image 1405 captured by an eye-tracking subsystem, such as eye-tracking subsystem 1400. In this example, image 1405 may include both the user's pupil 1408 and a glint 1410 near the same. In some examples, pupil 1408 and/or glint 1410 may be identified using an artificial-intelligence-based algorithm, such as a computer-vision-based algorithm. In one embodiment, image 1405 may represent a single frame in a series of frames that may be analyzed continuously in order to track the eye 1402 of the user. Further, pupil 1408 and/or glint 1410 may be tracked over a period of time to determine a user's gaze.

In one example, eye-tracking subsystem 1400 may be configured to identify and measure the inter-pupillary distance (IPD) of a user. In some embodiments, eye-tracking subsystem 1400 may measure and/or calculate the IPD of the user while the user is wearing the artificial reality system. In these embodiments, eye-tracking subsystem 1400 may detect the positions of a user's eyes and may use this information to calculate the user's IPD.

As noted, the eye-tracking systems or subsystems disclosed herein may track a user's eye position and/or eye movement in a variety of ways. In one example, one or more light sources and/or optical sensors may capture an image of the user's eyes. The eye-tracking subsystem may then use the captured information to determine the user's interpupillary distance, interocular distance, and/or a 3D position of each eye (e.g., for distortion adjustment purposes), including a magnitude of torsion and rotation (i.e., roll, pitch, and yaw) and/or gaze directions for each eye. In one example, infrared light may be emitted by the eye-tracking subsystem and reflected from each eye. The reflected light may be received or detected by an optical sensor and analyzed to extract eye rotation data from changes in the infrared light reflected by each eye.

The eye-tracking subsystem may use any of a variety of different methods to track the eyes of a user. For example, a light source (e.g., infrared light-emitting diodes) may emit a dot pattern onto each eye of the user. The eye-tracking subsystem may then detect (e.g., via an optical sensor coupled to the artificial reality system) and analyze a reflection of the dot pattern from each eye of the user to identify a location of each pupil of the user. Accordingly, the eye-tracking subsystem may track up to six degrees of freedom of each eye (i.e., 3D position, roll, pitch, and yaw) and at least a subset of the tracked quantities may be combined from two eyes of a user to estimate a gaze point (i.e., a 3D location or position in a virtual scene where the user is looking) and/or an IPD.

In some cases, the distance between a user's pupil and a display may change as the user's eye moves to look in different directions. The varying distance between a pupil and a display as viewing direction changes may be referred to as "pupil swim" and may contribute to distortion perceived by the user as a result of light focusing in different locations as the distance between the pupil and the display changes. Accordingly, measuring distortion at different eye positions and pupil distances relative to displays and generating distortion corrections for different positions and distances may allow mitigation of distortion caused by pupil swim by tracking the 3D position of a user's eyes and applying a distortion correction corresponding to the 3D position of each of the user's eyes at a given point in time. Thus, knowing the 3D position of each of a user's eyes may allow for the mitigation of distortion caused by changes in the distance between the pupil of the eye and the display by applying a distortion correction for each 3D eye position. Furthermore, as noted above, knowing the position of each of the user's eyes may also enable the eye-tracking subsystem to make automated adjustments for a user's IPD.

In some embodiments, a display subsystem may include a variety of additional subsystems that may work in conjunction with the eye-tracking subsystems described herein. For example, a display subsystem may include a varifocal subsystem, a scene-rendering module, and/or a vergence-processing module. The varifocal subsystem may cause left and right display elements to vary the focal distance of the display device. In one embodiment, the varifocal subsystem may physically change the distance between a display and the optics through which it is viewed by moving the display, the optics, or both. Additionally, moving or translating two lenses relative to each other may also be used to change the focal distance of the display. Thus, the varifocal subsystem may include actuators or motors that move displays and/or optics to change the distance between them. This varifocal subsystem may be separate from or integrated into the display subsystem. The varifocal subsystem may also be integrated into or separate from its actuation subsystem and/or the eye-tracking subsystems described herein.

In one example, the display subsystem may include a vergence-processing module configured to determine a vergence depth of a user's gaze based on a gaze point and/or an estimated intersection of the gaze lines determined by the eye-tracking subsystem. Vergence may refer to the simultaneous movement or rotation of both eyes in opposite directions to maintain single binocular vision, which may be naturally and automatically performed by the human eye. Thus, a location where a user's eyes are verged is where the user is looking and is also typically the location where the user's eyes are focused. For example, the vergence-processing module may triangulate gaze lines to estimate a distance or depth from the user associated with intersection of the gaze lines. The depth associated with intersection of the gaze lines may then be used as an approximation for the accommodation distance, which may identify a distance from the user where the user's eyes are directed. Thus, the vergence distance may allow for the determination of a location where the user's eyes should be focused and a depth from the user's eyes at which the eyes are focused, thereby providing information (such as an object or plane of focus) for rendering adjustments to the virtual scene.

The vergence-processing module may coordinate with the eye-tracking subsystems described herein to make adjustments to the display subsystem to account for a user's vergence depth. When the user is focused on something at a distance, the user's pupils may be slightly farther apart than when the user is focused on something close. The eye-tracking subsystem may obtain information about the user's vergence or focus depth and may adjust the display subsystem to be closer together when the user's eyes focus or verge on something close and to be farther apart when the user's eyes focus or verge on something at a distance.

The eye-tracking information generated by the above-described eye-tracking subsystems may also be used, for example, to modify various aspect of how different computer-generated images are presented. For example, a display subsystem may be configured to modify, based on information generated by an eye-tracking subsystem, at least one aspect of how the computer-generated images are presented. For instance, the computer-generated images may be modified based on the user's eye movement, such that if a user is looking up, the computer-generated images may be moved upward on the screen. Similarly, if the user is looking to the side or down, the computer-generated images may be moved to the side or downward on the screen. If the user's eyes are closed, the computer-generated images may be paused or removed from the display and resumed once the user's eyes are back open.

The above-described eye-tracking subsystems can be incorporated into one or more of the various artificial reality systems described herein in a variety of ways. For example, one or more of the various components of system 1300 and/or eye-tracking subsystem 1400 may be incorporated into an artificial-reality system, such as head-mounted display device 100 in FIG. 1, augmented-reality system 1100 in FIG. 11, and/or a mixed- or virtual-reality system, to enable these systems to perform various eye-tracking tasks (including one or more of the eye-tracking operations described herein).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A hinge assembly comprising:
   a stationary member;
   a rotary member that is rotatable with respect to the stationary member about a rotational axis;

a wiring passage defined within the stationary member and the rotary member, the wiring passage surrounding and extending along the rotational axis; and a biasing member surrounding at least a portion of the wiring passage and positioned to apply a biasing force to hold the rotary member in one of a plurality of selected orientations relative to the stationary member, wherein the biasing member comprises a spring surrounding a portion of at least one of the stationary member or the rotary member, and wherein the wiring passage is configured to accommodate at least one cable passing therethrough.

2. The hinge assembly of claim 1, wherein the hinge assembly further comprises a holding member comprising:
a biasing interface portion that abuts the biasing member; and
an engagement member that is forced by the biasing member into one of a plurality of engagement recesses defined by the rotary member or the stationary member to hold the rotary member in the selected orientation relative to the stationary member.

3. The hinge assembly of claim 2, wherein:
each of the plurality of engagement recesses is at least partially defined by a camming surface of the rotary member or the stationary member; and
the engagement member is slidable along the camming surface between the plurality of engagement recesses during rotation of the rotary member with respect to the stationary member.

4. The hinge assembly of claim 3, wherein the camming surface further comprises a sloped transition region between two engagement recesses of the plurality of engagement recesses, the sloped transition region protruding toward the biasing member such that the biasing interface portion of the holding member is moved in a direction opposite a direction of the biasing force applied by the biasing member as the engagement member slides along the sloped transition region.

5. The hinge assembly of claim 4, wherein the camming surface further comprises an over-extension region that extends from a side of one of the two engagement recesses opposite the sloped transition region, the over-extension region protruding toward the biasing member such that the biasing interface portion of the holding member is moved in the direction opposite the direction of the biasing force applied by the biasing member as the engagement member slides along the over-torque region.

6. The hinge assembly of claim 3, wherein the engagement member protrudes from biasing interface portion toward the camming surface.

7. The hinge assembly of claim 2, wherein the holding member is rotationally constrained by the stationary member to prevent rotation of the holding member with respect to the stationary member about the rotational axis while allowing for movement of the holding member in a direction substantially parallel to the rotational axis.

8. The hinge assembly of claim 1, wherein the biasing member applies the biasing force in a direction substantially parallel to the rotational axis.

9. The hinge assembly of claim 1, wherein the spring is at least partially compressed between a surface of the stationary member and an opposing surface of the rotary member.

10. The hinge assembly of claim 1, wherein the spring exhibits a peak force of from approximately 20 N to approximately 150 N.

11. The hinge assembly of claim 1, wherein at least one of the stationary member or the rotary member comprises a barrel portion surrounding the wiring passage.

12. A head-mounted device comprising:
a frame;
a temple extending from a peripheral region of the frame;
at least one cable communicatively coupled to each of the temple and the frame; and
a hinge assembly coupling the temple to the frame, the hinge assembly comprising:
a stationary member coupled to the frame;
a rotary member coupled to the temple and rotatable with respect to the stationary member about a rotational axis;
a wiring passage defined within the stationary member and the rotary member, the wiring passage surrounding and extending along the rotational axis, wherein the at least one cable passes through the wiring passage; and
a biasing member surrounding at least a portion of the wiring passage and positioned to apply a biasing force to hold the rotary member in one of a plurality of selected orientations relative to the stationary member.

13. The head-mounted device of claim 12, wherein:
the hinge assembly further comprises a holding member comprising:
a biasing interface portion that abuts the biasing member; and
an engagement member that is forced by the biasing member into one of a plurality of engagement recesses defined by the rotary member or the stationary member to hold the rotary member in the selected orientation relative to the stationary member.

14. The head-mounted device of claim 12, wherein the rotary member comprises an extension arm that is secured to the temple, the extension arm extending longitudinally in a direction substantially perpendicular to the rotational axis.

15. The head-mounted device of claim 12, wherein the at least one cable extends through the wiring passage in a direction that is nonparallel to portions of the at least one cable disposed outside the wiring passage.

16. The head-mounted device of claim 12, wherein the at least one cable is configured to transmit at least one of a data signal or power between at least one electronic component of the temple and at least one electronic component of the frame.

17. The hinge assembly of claim 12, wherein the at least one cable comprises an electrical cable or an optical cable.

18. A head-mounted device comprising:
a frame;
a temple; and
a hinge assembly coupling the temple to the frame, the hinge assembly comprising:
a stationary member coupled to the frame;
a rotary member coupled to the temple and rotatable with respect to the stationary member about a rotational axis;
a wiring passage defined within the stationary member and the rotary member, the wiring passage surrounding and extending along the rotational axis; and
a biasing member surrounding at least a portion of the wiring passage and positioned to apply a biasing force to hold the rotary member in one of a plurality of selected orientations relative to the stationary member.

19. The head-mounted device of claim 18, wherein:
the hinge assembly further comprises a holding member comprising:
- a biasing interface portion that abuts the biasing member; and
- an engagement member that is forced by the biasing member into one of a plurality of engagement recesses defined by the rotary member or the stationary member to hold the rotary member in the selected orientation relative to the stationary member.

20. The head-mounted device of claim 18, wherein the biasing member comprises a spring surrounding a portion of at least one of the stationary member or the rotary member.

* * * * *